(12) United States Patent
Furuse et al.

(10) Patent No.: US 8,726,758 B2
(45) Date of Patent: May 20, 2014

(54) ARRANGEMENT STRUCTURE OF PARKING BRAKE LEVER AND ARRANGEMENT STRUCTURE OF OPERATING LEVER IN VEHICLE

(75) Inventors: Hiroshi Furuse, Saitama (JP); Ikuo Hara, Saitama (JP); Rui Maeda, Saitama (JP); Chihiro Iida, Saitama (JP); Manabu Ichikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 12/873,353

(22) Filed: Sep. 1, 2010

(65) Prior Publication Data

US 2011/0056323 A1 Mar. 10, 2011

(30) Foreign Application Priority Data

Sep. 4, 2009 (JP) ................................ 2009-204914

(51) Int. Cl.
*F16H 1/12* (2006.01)
(52) U.S. Cl.
USPC ..................................... 74/501.6; 188/24.18
(58) Field of Classification Search
USPC .............. 74/491, 523, 535, 538, 540, 473.14, 74/489, 501.6, 502.2, 519; 188/24.18, 188/24.22, 2 D, 72.9
See application file for complete search history.

(56) References Cited

U.S. PATENT DOCUMENTS

| | | | | |
|---|---|---|---|---|
| 3,948,361 | A * | 4/1976 | Carlson ....................... | 188/24.18 |
| 4,188,834 | A * | 2/1980 | Wakatsuki et al. ............. | 74/489 |
| 4,487,282 | A * | 12/1984 | Wakatsuki et al. ........... | 180/210 |
| 4,667,785 | A * | 5/1987 | Toyoda et al. .............. | 192/13 A |
| 6,378,663 | B1 * | 4/2002 | Lee ................................ | 188/2 F |
| 6,382,048 | B1 * | 5/2002 | Youn et al. ...................... | 74/529 |
| 6,389,928 | B1 * | 5/2002 | Kobayashi et al. ............. | 74/536 |
| 6,450,301 | B1 * | 9/2002 | Iizuka et al. ..................... | 188/26 |
| 6,685,281 | B2 * | 2/2004 | MacGregor et al. ........... | 303/123 |
| 7,080,723 | B2 * | 7/2006 | Uno et al. ...................... | 192/217 |
| 7,198,129 | B2 * | 4/2007 | Sakaki et al. ................. | 180/219 |
| 7,574,943 | B2 * | 8/2009 | Wortmann ..................... | 74/512 |
| 7,584,826 | B2 * | 9/2009 | Yamamoto ..................... | 188/2 D |
| 7,793,563 | B2 * | 9/2010 | Iguchi et al. ..................... | 74/488 |
| 2003/0084743 | A1 * | 5/2003 | Djordjevic .................... | 74/502.2 |
| 2003/0115982 | A1 * | 6/2003 | Reese et al. .............. | 74/501.5 R |
| 2004/0245737 | A1 * | 12/2004 | Hallgrimsson et al. ..... | 280/87.01 |
| 2007/0068318 | A1 * | 3/2007 | Jordan et al. ................. | 74/502.2 |
| 2008/0011563 | A1 * | 1/2008 | Yamamoto .................... | 188/265 |
| 2008/0196539 | A1 * | 8/2008 | Schmauder .................... | 74/519 |
| 2011/0056323 | A1 * | 3/2011 | Furuse et al. ................... | 74/491 |

FOREIGN PATENT DOCUMENTS

| | | |
|---|---|---|
| JP | 60-143191 A | 7/1985 |
| JP | 4-292287 A | 10/1992 |
| JP | 10-324286 A | 12/1998 |
| JP | 2005-1511 A | 1/2005 |

* cited by examiner

*Primary Examiner* — Troy Chambers
*Assistant Examiner* — Alexander Vu
(74) *Attorney, Agent, or Firm* — Birch, Stewart, Kolasch & Birch, LLP

(57) ABSTRACT

A parking brake lever which provides ease of recognition of a locked state of the parking brake lever and improves the arrangement of the parking brake lever around a handle bar. A parking brake lever includes a handle rear arm portion provided adjacent to a left handle bar rearward thereof in an unlocked position in which a parking brake caliper is in an unlocked state, and a handle upper arm portion provided adjacent to the left handle bar upward thereof in the unlocked position in which the parking brake caliper is in the unlocked state. A rotating shaft of the parking brake lever is provided in the handle rear arm portion that is substantially parallel to the direction of the axis of the left handle bar, so that the parking brake caliper can be operated into the locked state by pulling the parking brake lever upward.

20 Claims, 19 Drawing Sheets

ARRANGEMENT STRUCTURE OF PARKING BRAKE LEVER AND ARRANGEMENT STRUCTURE OF OPERATING LEVER IN VEHICLE

CROSS-REFERENCE TO RELATED APPLICATIONS

The present application claims priority under 35 USC 119 to Japanese Patent Application No. 2009-204914 filed on Sep. 4, 2009 the entire contents of which are hereby incorporated by reference.

BACKGROUND OF THE INVENTION

1. Field of the Invention

The present invention relates to an arrangement structure of a parking brake lever and an arrangement structure of an operating lever in a vehicle such as a saddle-type vehicle.

2. Description of Background Art

JP-A-2005-1511 discloses a structure in which a bracket is secured on the left side of a handle bar of a motorcycle, and a clutch lever and a parking brake lever are supported by the bracket in a state in which respective axes thereof extend parallel to each other.

In the structure shown in JP-A-2005-1511, ease of operation of the parking brake lever is achieved because the parking brake lever is locked only by rotating the parking brake lever toward the clutch lever with the operator's left hand while gripping the handle bar with his or her right hand when operating the parking brake lever. In addition, even when a parking brake is kept in the locked state when starting the vehicle, since the parking brake lever comes to a position in which the rotation of the clutch lever is restrained when operating the clutch lever, ease of recognition of the locked state of the parking brake lever is also achieved.

In addition, in the structure according to JP-A-2005-1511 described above, the ease of recognition of the locked state of the parking lever is achieved because the clutch lever is arranged on the handle bar, and the operator's hand comes into contact with the parking brake lever when operating the clutch for starting the vehicle. However, in the case of a vehicle having no clutch lever on the handle bar, to make the operator aware of the locked state of the parking brake lever in association with the operation performed before starting the vehicle such as the clutch operation cannot be expected. Therefore, in the arrangement of the parking brake lever on the handle bar in a vehicle having no clutch lever on the handle bar, a structure which achieves the ease of recognition of the locked state of the parking brake lever is desired.

In the structure according to JP-A-2005-1511, when the parking brake lever is brought into an unlocked state, the parking brake lever is positioned so as to extend forward of the handle bar along the handle bar. However, in this arrangement, the parking brake lever is prominent in appearance and hence it is far from being arranged favorably around the handle bar.

Problems relating to the ease of recognition of operating state of the parking brake lever or the arrangement thereof are not limited to the parking brake lever, but are applicable generally to various operating levers.

SUMMARY AND OBJECTS OF THE INVENTION

In view of such circumstances, it is an object of an embodiment of the present invention to provide an arrangement structure of a parking brake lever in a vehicle, which is superior in operability, achieves ease of recognition of the locked state of the parking brake lever even when the parking brake lever is arranged in the periphery of a handle bar of a vehicle having no clutch lever and, simultaneously, and achieves improvement of compactness of arrangement of the parking brake lever around the handle bar.

It is another object of an embodiment of the present invention to provide a favorable arrangement structure of the operating lever, which achieves improvement of the compactness of arrangement of the operating lever which is not limited to the parking lever around the handle bar of the vehicle, and achieves ease of recognition of the operating state.

In order to solve the above-described problems, according to an embodiment of the present invention an arrangement structure of a parking brake lever in a vehicle (for example, a motorcycle 1 in the embodiment) is provided wherein the vehicle includes a handle bar (for example, a left handle bar 20 or a right handle bar 19 in the embodiment) configured to steer a front wheel 3 of the vehicle; a braking device (for example, a parking brake caliper 14 in the embodiment) configured to bring a vehicle wheel (for example, a rear wheel 4 in the embodiment) into a locked state or an unlocked state; a cable (for example, a parking brake cable 16 in the embodiment) connected at one end thereof to the braking device; a parking brake lever 28 having the other end of the cable connected thereto and being capable of operating the braking device into the locked state or the unlocked state; and a holder member 27 mounted on the handle bar and pivotally supporting the parking brake lever so as to be rotatable, wherein the parking brake lever includes a handle vertical arm portion (for example, a handle rear arm portion 66 in the embodiment) provided adjacent to the handle bar either forward or rearward thereof in an unlocked position in which the braking device is in the unlocked state, and a handle upper arm portion (for example, a handle upper arm portion 67 in the embodiment) provided adjacent to the handle bar upward thereof in the unlocked position in which the braking device is in the unlocked state, a rotating shaft 44 of the parking brake lever is provided on the handle vertical arm portion so as to extend to be substantially parallel to the direction of the axis of the handle bar, and the parking brake lever is capable of operating the braking device into the locked state by being pulled upward.

According to an embodiment of the present invention, the handle upper arm portion includes a suspending portion (for example, a forward-inclined portion 91 in the embodiment) suspending downward with respect to the upper end of the handle bar either forward or rearward of the handle bar in the unlocked position.

According to an embodiment of the present invention, the holder member includes two half members (for example, a holder body 33 and a split clamp half 34 in the embodiment) configured to split-clamp the handle bar, and the handle upper arm portion is formed to extend in the width direction so as to cover a split clamp portion of the holder member from above in the unlocked position.

According to an embodiment of the present invention, the handle upper arm portion is provided with an elastic member (for example, a rubber member 96 in the embodiment) on a lower surface thereof so as to come into abutment with an upper portion of the split clamp portion of the holder member in the unlocked position.

According to an embodiment of the present invention, the handle vertical arm portion is provided on the underside thereof with an extending portion (for example, a front extending portion 68 in the embodiment) extending either rearward or forward toward the handle bar, and the rotating shaft of the parking brake lever is provided on the extending portion.

According to an embodiment of the present invention, the vehicle includes an indicator 26A configured to display the locked state of the braking device, and an indication switch 80 configured to enable or disable the showing of the indicator. The indication switch is arranged on the holder member adjacent to the rotating shaft of the parking brake lever, and the handle vertical arm portion is provided on the extending portion thereof with an extending arm portion (for example, a front extending arm portion 75 in the embodiment) extending from the rotating shaft of the parking brake lever further rearward or forward toward the handle bar, and the other end of the cable is connected to the extending arm portion and a distal end of the extending arm portion is arranged so as to come into abutment with or move away from the indication switch in association with the rotation of the parking brake lever.

According to an embodiment of the present invention, the handle bar includes a switch box 25 mounted thereon for operating lighting systems of the vehicle, and the parking brake lever is arranged adjacent to the switch box.

According to an embodiment of the present invention, the parking brake lever is configured by rotatably assembling the handle upper arm portion to the upper portion of the handle vertical arm portion, and the handle upper arm portion and the handle vertical arm portion are assembled via an energizing spring member (for example, a spring 95 in the embodiment) energized in the direction to pull up the parking brake lever.

According to an embodiment of the present invention, the handle vertical arm portion is provided with an energizing spring member seat 84 positioned at a certain distance from the handle upper arm portion and extending along the handle upper arm portion, the handle upper arm portion is provided with an energizing spring member accommodating depression (for example, a spring accommodating annular depression 93 in the embodiment) formed so as to face the energizing spring member seat for accommodating the energizing spring member, the handle upper arm portion and the handle vertical arm portion are rotatable by being connected with each other with a pin member (for example, a connecting shaft 87 in the embodiment). The handle upper arm portion is provided with a stopper portion (for example, an accommodating portion 89 in the embodiment) on the opposite side of the pin member from the energizing spring member so as to extend along an upper portion of the handle vertical arm portion for restricting the rotation of the handle upper arm portion by coming into abutment with the upper portion.

According to an embodiment of the present invention, the parking brake lever is pivotally supported so that the handle upper arm portion faces straight forward toward the front of the vehicle.

According to an embodiment of the present invention, an arrangement structure of an operating lever in a vehicle (for example, the motorcycle 1 in the embodiment), includes: a handle bar (for example, the left handle bar 20 or the right handle bar 19 in the embodiment) for steering a front wheel 3 of the vehicle; a movable component (for example, the parking brake caliper 14 in the embodiment) taking different positions depending on whether it is in an operating state or a non-operating state; a cable (for example, the parking brake cable 16 in the embodiment) connected at one end thereof to the movable component; the operating lever (for example, the parking brake lever 28 in the embodiment) having the other end of the cable connected thereto and being capable of operating the movable component into the operating state or the non-operating state; and a holder member 27 mounted on the handle bar and pivotally supporting the operating lever so as to be rotatable, wherein the operating lever includes a handle vertical arm portion (for example, the handle rear arm portion 66 in the embodiment) provided adjacent to the handle bar either forward or rearward thereof in a non-operating position in which the movable component is in the non-operating state, and a handle upper arm portion 67 provided adjacent to the handle bar upward thereof in the non-operating position in which the movable component is in the non-operating state. A rotating shaft 44 of the operating lever is provided on the handle vertical arm portion so as to extend to be substantially parallel to the direction of the axis of the handle bar, and the operating lever is capable of operating the movable component into the operating state by being pulled upward.

According to an embodiment of the present invention, an arrangement structure of an operating lever having substantially an L-shape when viewed in the direction of an axis of a handle bar (for example, the left handle bar 20 or the right handle bar 19 in the embodiment), includes: a grip portion (for example, the handle upper arm portion 67 in the embodiment) provided on one arm portion of the operating lever; and a pivotally supported portion pivotally supported by the handle bar so as to be rotatable at a distal end of the other arm portion (for example, the handle rear arm portion 66 in the embodiment), wherein:

the operating lever is provided so that the handle bar is arranged between the grip portion and the pivotally supported portion.

According to an embodiment of the present invention, since the braking device can be brought into the locked state by rotating the parking brake lever upward, the desirable operability of the parking brake lever is ensured. Simultaneously, since the parking brake lever is arranged so as to embrace the handle bar with the parking brake lever in the unlocked position in which the braking device is in the unlocked state, the compact arrangement of the parking brake lever in the vehicle is also achieved.

In addition, when the braking device is in the locked state, the parking brake lever is positioned to project upward in comparison with the unlocked position where the parking brake lever is compactly arranged. Therefore, the locked state is made further recognizable.

According to an embodiment of the present invention, ease of operation is achieved by securing a certain length of the parking brake lever, and further a compact arrangement of the parking brake lever in the vehicle is achieved because the parking brake lever is provided so as to embrace the handle bar more in the unlocked position.

According to an embodiment of the present invention, the operability is enhanced by widening the width of the parking brake lever above the holder member, and the compact arrangement of both components in the width direction is achieved by arranging the parking brake lever and the holder member one so as to overlap in the vertical direction.

Furthermore, by covering the split clamp portion of the holder member with the parking brake lever, enhancement of the appearance and the sense of compactness of the parking brake lever in the unlocked position are achieved.

According to an embodiment of the present invention, the stopper of the parking brake lever in the unlocked position is achieved by the abutment with the holder member. In addition, the parking brake lever and the holder member are protected by the intermediary of the elastic member.

According to an embodiment of the present invention, the rotating shaft of the parking brake lever which tends to be upsized can be mounted unobtrusively owing to the position of the rotating shaft of the parking brake lever below the handle bar.

In addition, in the vehicle having a fuel tank rearward of the handle bar, if the handle vertical arm portion of the parking brake lever is arranged rearward of the handle bar, the rotating shaft is arranged forward on the side of the handle bar. Therefore, the interference between the fuel tank and the holder member which may occur when the handle bar is turned is easily avoided.

According to an embodiment of the present invention, turning on and off of the indication switch is achieved by using the shape of the extending arm portion extending from the lower portion of the handle vertical arm portion for connecting the cable of the parking brake lever as a cam, so that the indication switch can be arranged as compact as possible.

According to an embodiment of the present invention, the feeling of compactness of the parking brake lever is further enhanced by arranging the parking brake lever adjacent to the switch box.

According to an embodiment of the present invention, in the case where an object or the operator's hand is placed on the pull-up type parking brake lever from above by mistake, the handle upper arm portion is rotated downward to receive the load by the energizing spring member, so that exertion of a heavy load on the lever rotating shaft from above the handle vertical arm portion is avoided.

According to an embodiment of the present invention, the arrangement of the energizing spring member so as to be hardly visible from the appearance is achieved in a simple and compact configuration.

According to an embodiment of the present invention, the parking brake lever extends along the fore-and-aft direction of the vehicle, so that the operability is further enhanced.

According to an embodiment of the present invention, various operating levers in addition to the parking brake lever are compactly arranged on the handle bar, so that the operating levers are easy to be recognized when they and are at the position in the operating state is achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 11(a) and FIG. 11(b) are cross-sectional views relating to FIG. 3, in which FIG. 11(a) is a cross-sectional view taken along the line a-a, and FIG. 11(b) is a cross-sectional view taken along the line b-b;

DETAILED DESCRIPTION OF THE PREFERRED EMBODIMENTS

Figure 1:
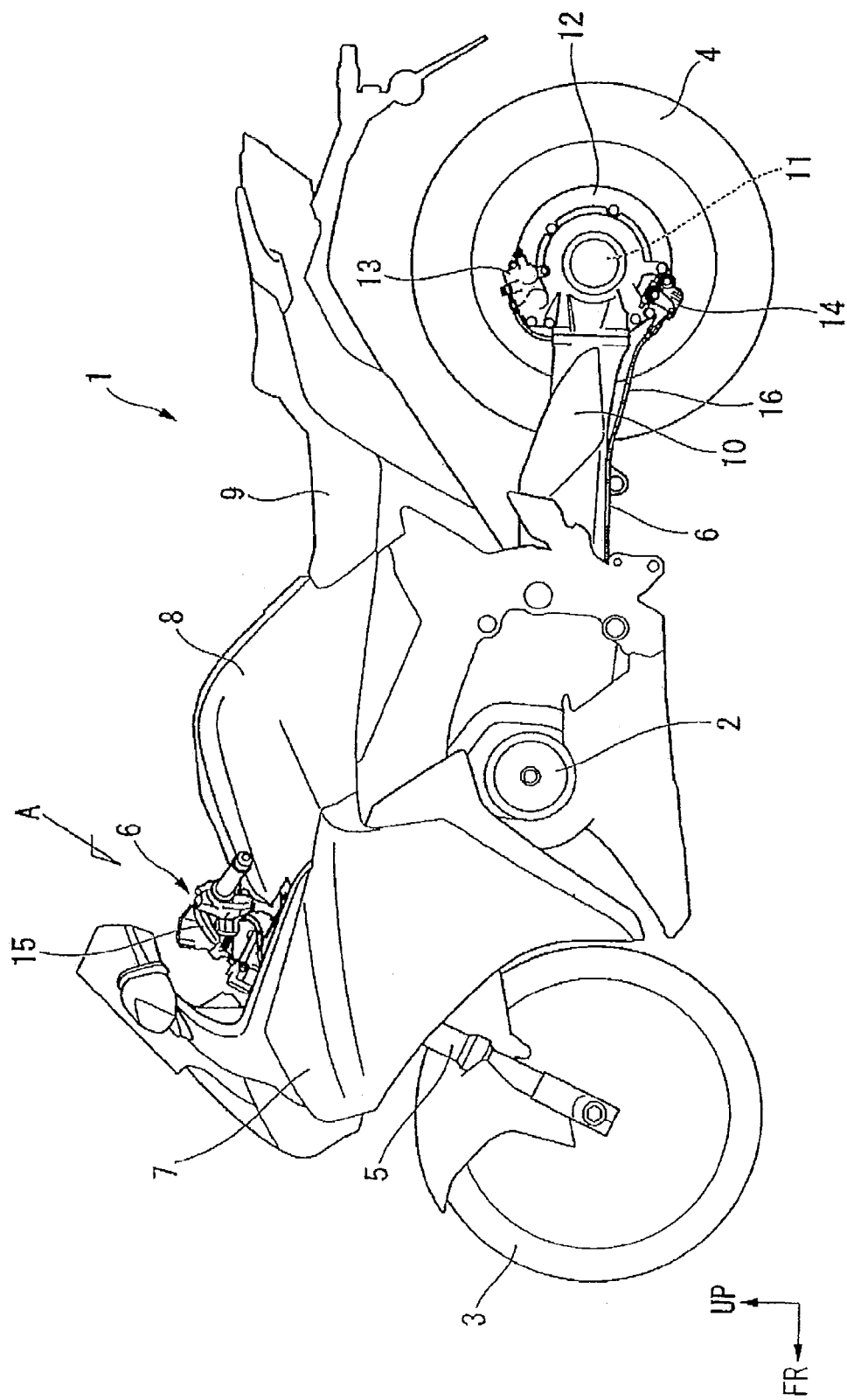
FIG. 1 is a left side view of a motorcycle according to an embodiment of the present invention.

Embodiments of the present invention will be described with reference to the drawings. Referring now to FIGS. 1 to 4, a schematic configuration of a motorcycle 1 as an example of a vehicle having a parking brake lever apparatus mounted thereon will be described. In the drawings used for description given below, an arrow FR which indicates a forward direction of the vehicle, an arrow UP which indicates an upward direction of the vehicle, and an arrow LH which indicates a leftward direction of the vehicle are shown at right positions, and these directions are used in the description of the motorcycle 1 as needed.

The motorcycle 1 includes an engine 2, which has a DCT (dual clutch transmission) integrated therein, mounted on a vehicle body frame, not shown, at substantially the center thereof in the fore-and-aft direction, a front wheel 3 arranged forward of the engine 2, and a rear wheel 4 arranged rearward of the engine 2.

The front wheel 3 is rotatably supported by a pair of left and right front forks 5, 5, which constitute a steering system of the vehicle, and a front wheel steering device 6, which is capable of steering the front wheel 3, is provided on the top of the front forks 5, 5.

The front of the front wheel steering device 6 is covered with a front cowl 7, which covers the front portion of a vehicle body from both sides of the front portion, and the front cowl 7 is integrally provided with a headlight, side mirrors, and a display panel for various instruments. A fuel tank 8 is provided rearward of the front wheel steering device 6, and a seat 9 on which an occupant is seated is provided rearward of the fuel tank 8.

The rear wheel 4 is rotatably supported at a rear portion of a swing arm 10 extending from the rear of the engine 2, and a brake disk 12, which rotates integrally with the rear wheel 4, is provided in the periphery of an axle portion 11 of the rear wheel 4. The brake disk 12 is configured to control the rotation of the rear wheel 4 by being pressed from both side surfaces thereof, and a rear brake caliper 13 and a parking brake caliper 14, which are capable of pressing the brake disk 12 from both side surfaces thereof, are provided at the rear end portion of the swing arm 10.

One end of a brake hose, not shown, is connected to the rear brake caliper 13 which serves as a drive brake, and the other end of the brake hose is connected to a rear master cylinder provided with a rear brake pedal (foot brake). In contrast, one end of a parking brake cable 16 is connected to the parking brake caliper 14, and the other end of the parking brake cable 16 extends to the front wheel steering device 6 and is connected to a parking brake lever apparatus 15 mounted on the front wheel steering device 6.

Figure 2:
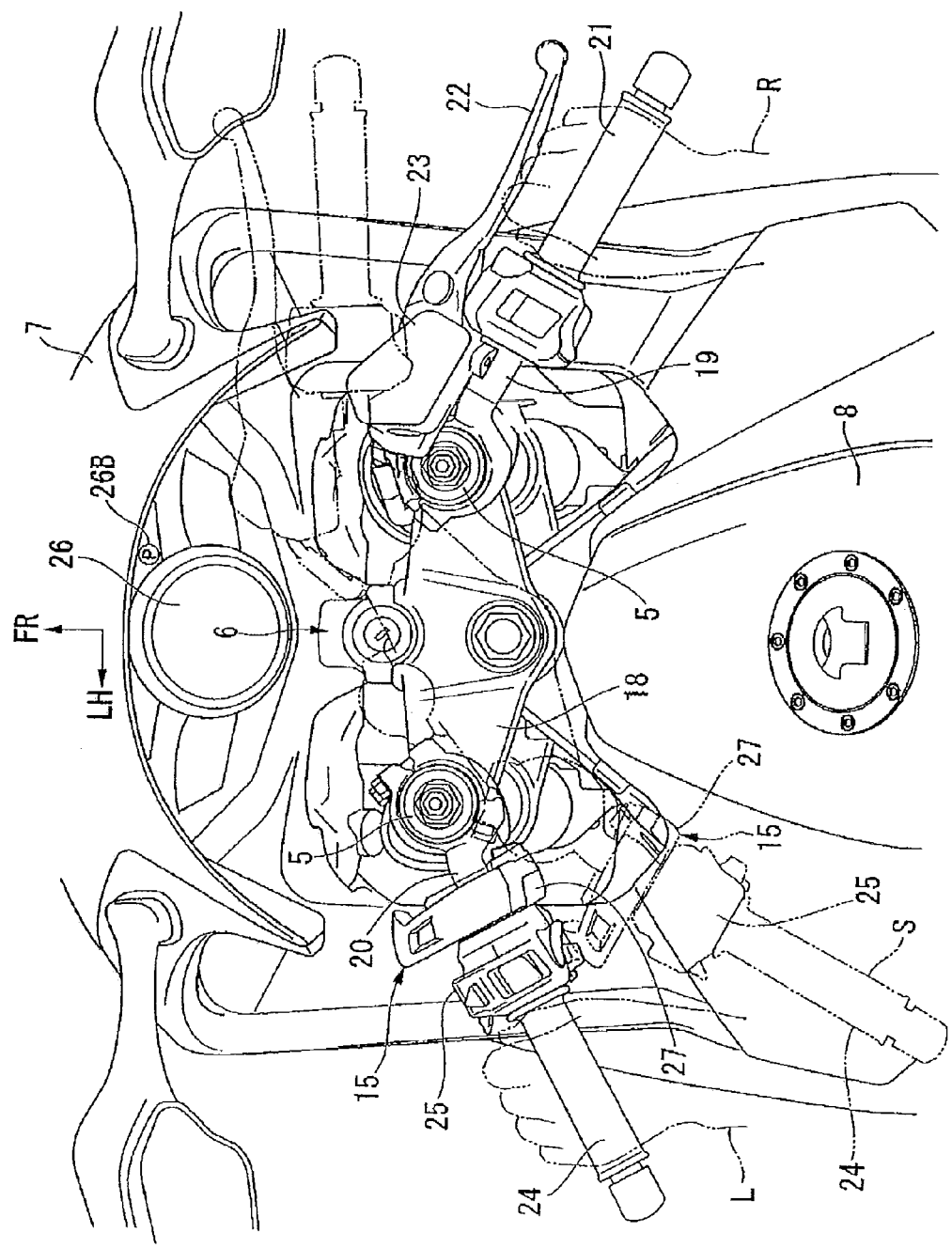
FIG. 2 is a drawing viewed in the direction of an arrow A in FIG. 1.

As shown in FIG. 2 in an enlarged scale, the front wheel steering device 6 in this embodiment is configured in such a manner that upper end portions of the left and right front forks 5, 5 are penetrated through both end portions of a top bridge 18 extending in the width direction of the vehicle, a right handle bar 19 is fixed to the upper end portion of the right front fork, and a left handle bar 20 is fixed to the upper end portion of the left front fork.

In FIG. 2, a combination panel 26 includes a speedometer integrally installed on the front cowl 7 and is capable of displaying various indicators. An indicator 26A lights up according to the operation of the parking brake lever apparatus 15.

The right handle bar 19 is fixed at one end to the upper end portion of the right front fork 5 and extends rightward of the vehicle, and the left handle bar 20 is fixed to the upper end portion of the left front fork 5 and extends leftward of the vehicle.

An accelerator grip 21 extending rightward of the vehicle along the right handle bar 19 is mounted on a distal end portion of the right handle bar 19, and a front brake lever 22, which extends toward the front of the accelerator grip 21 from the distal end portion of the right handle bar 19, is also supported pivotably by the distal end portion of the right handle bar 19. Provided on the right handle bar 19 inside the accelerator grip 21 in the width direction is a reservoir tank 23 for storing brake oil for a front brake.

Figure 3:
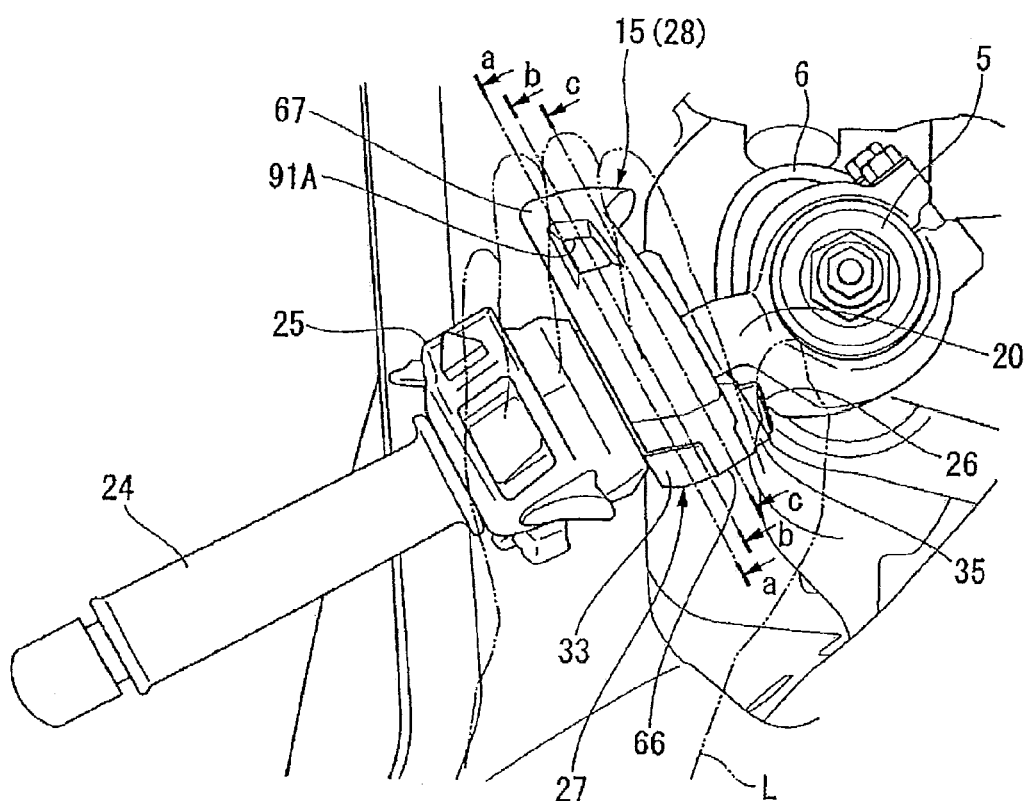
FIG. 3 is a partially enlarged view of a handle bar.
Figure 4:
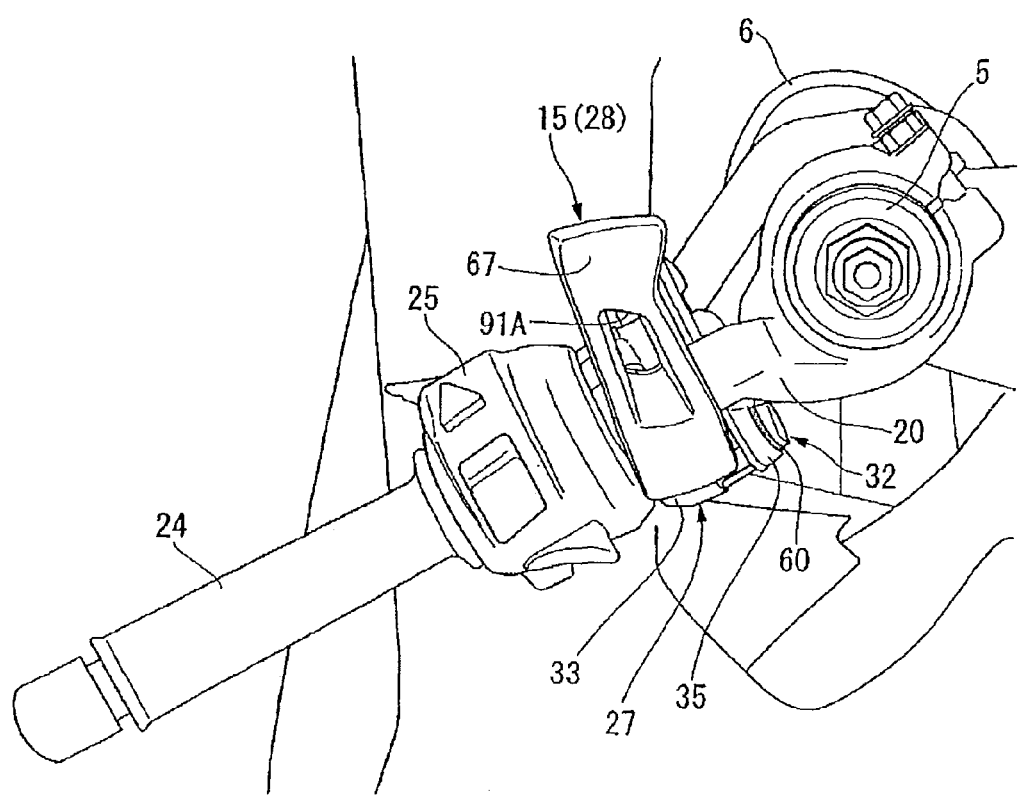
FIG. 4 is a partially enlarged view of the handle bar.
Figure 5:
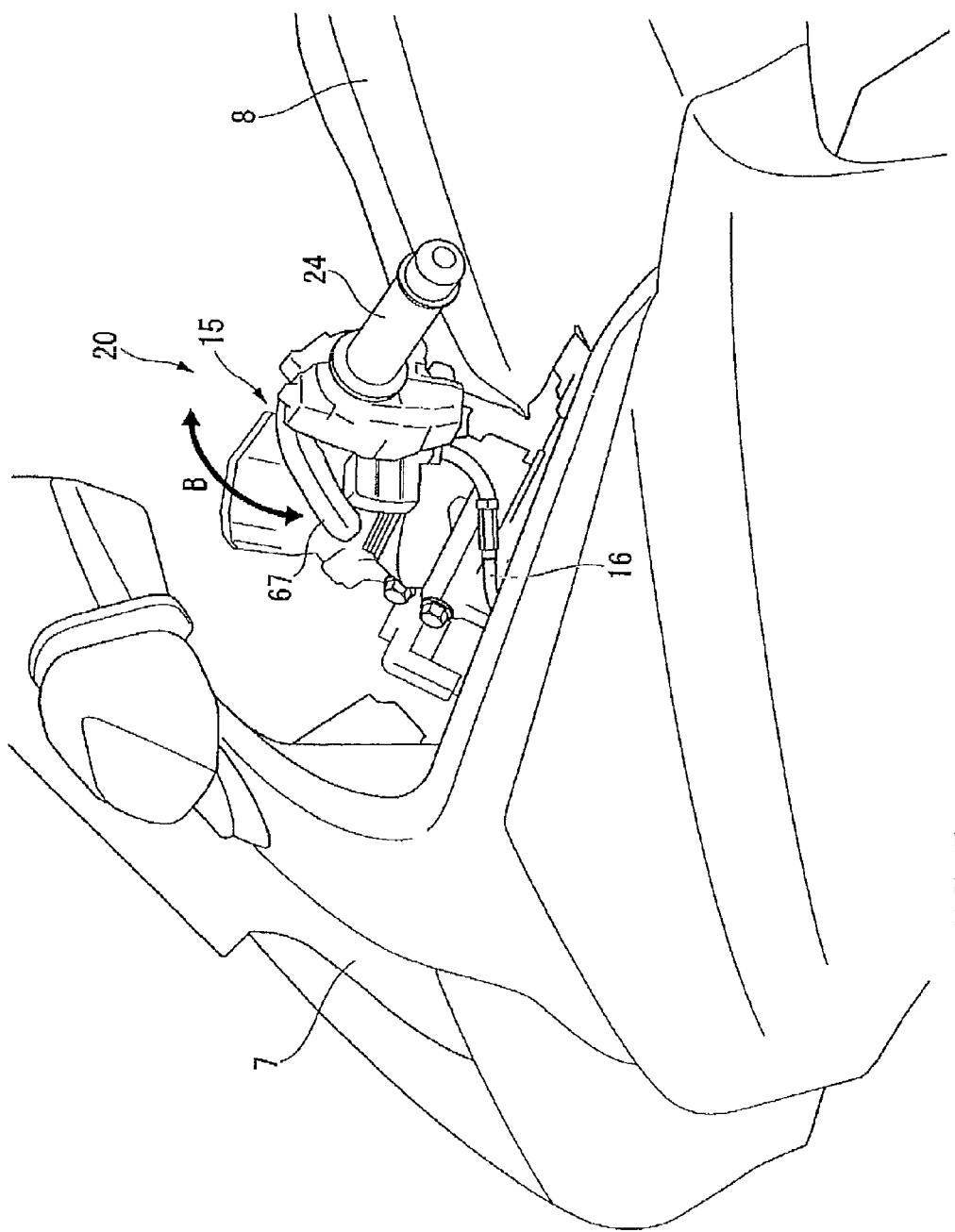
FIG. 5 is a drawing showing a front side portion of the motorcycle in an enlarged scale.

On the other hand, as shown in FIG. 3 to FIG. 5, a grip 24 extending leftward of the vehicle along the left handle bar 20 is mounted on a distal end portion of the left handle bar 20, and a switch box 25 including various operating switches such as a shift-up switch, a shift-down switch, a hazard switch, a change-over switch for lighting systems such as the headlight, and a horn is provided on the left handle bar 20 inside the grip 24 in the width direction. Here, since the motorcycle 1 employs the engine 2 having the DCT integrated therein, gear shifting is achieved automatically. Therefore, it is not necessary to operate a clutch for the gear shifting and hence a clutch lever is not provided on the left handle bar 20.

Installed on the left handle bar 20 at a position adjacent to the switch box 25 inside in the width direction is the parking brake lever apparatus 15.

Figure 6:
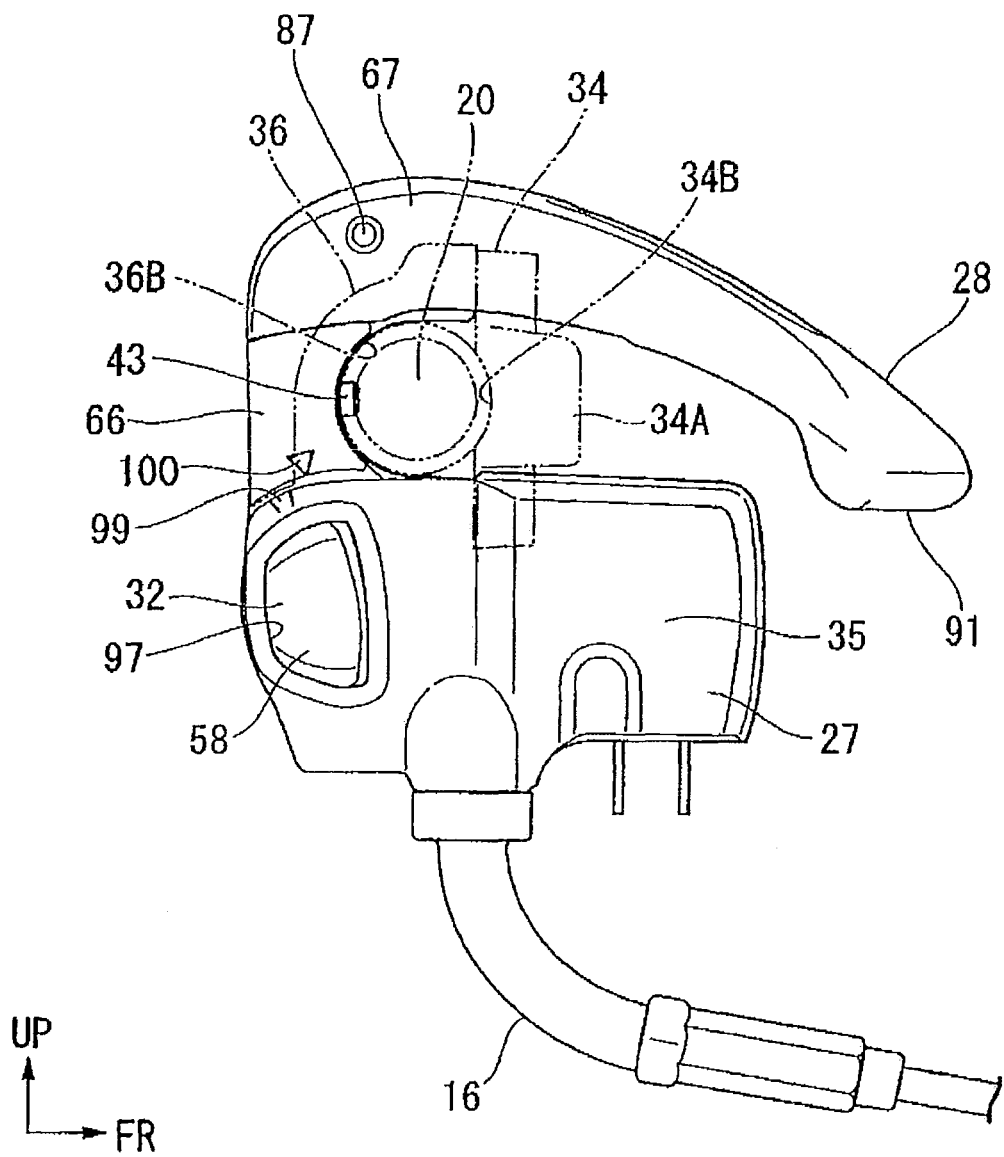
FIG. 6 is a side view of a parking brake lever apparatus viewed from inside a vehicle body in the direction of an axis of the handle bar.
Figure 7:
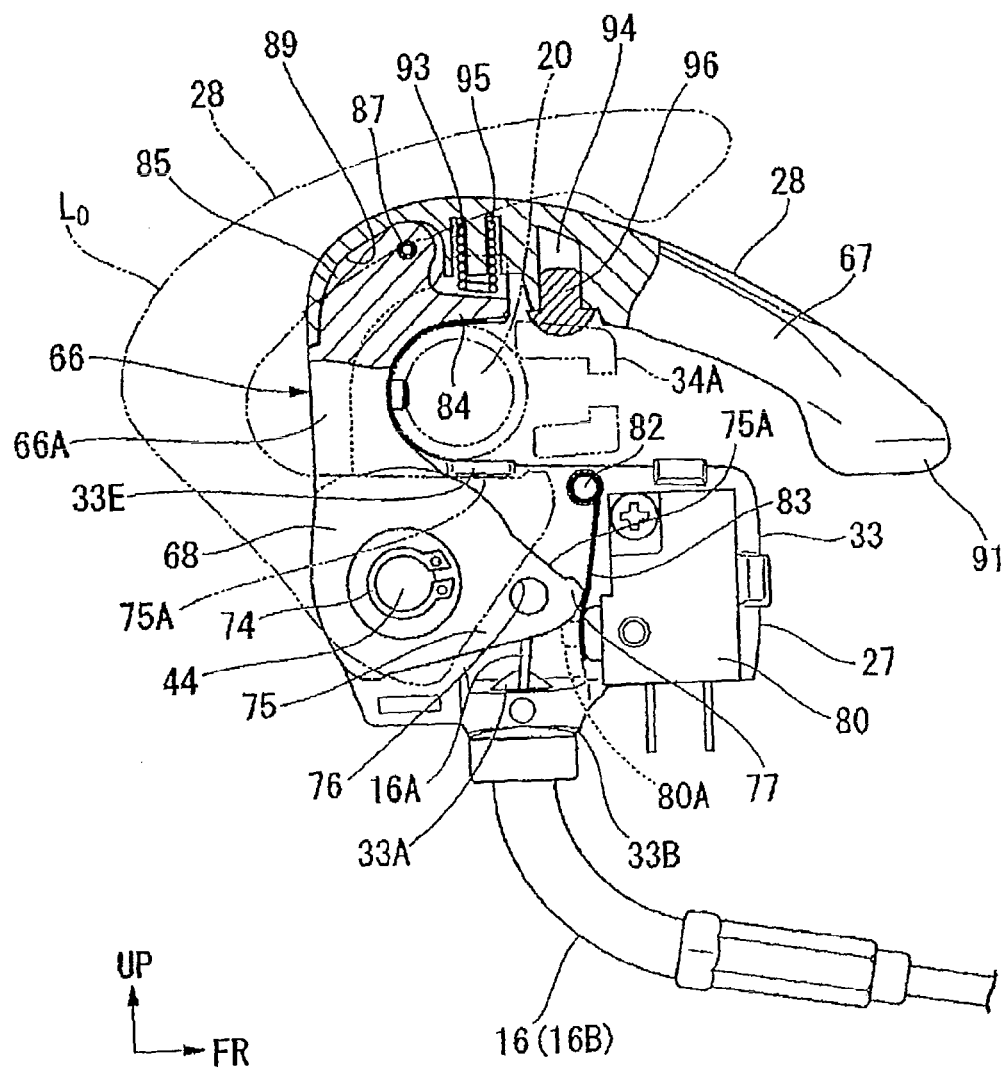
FIG. 7 is a vertical cross-sectional view of the parking brake lever apparatus.
Figure 8:
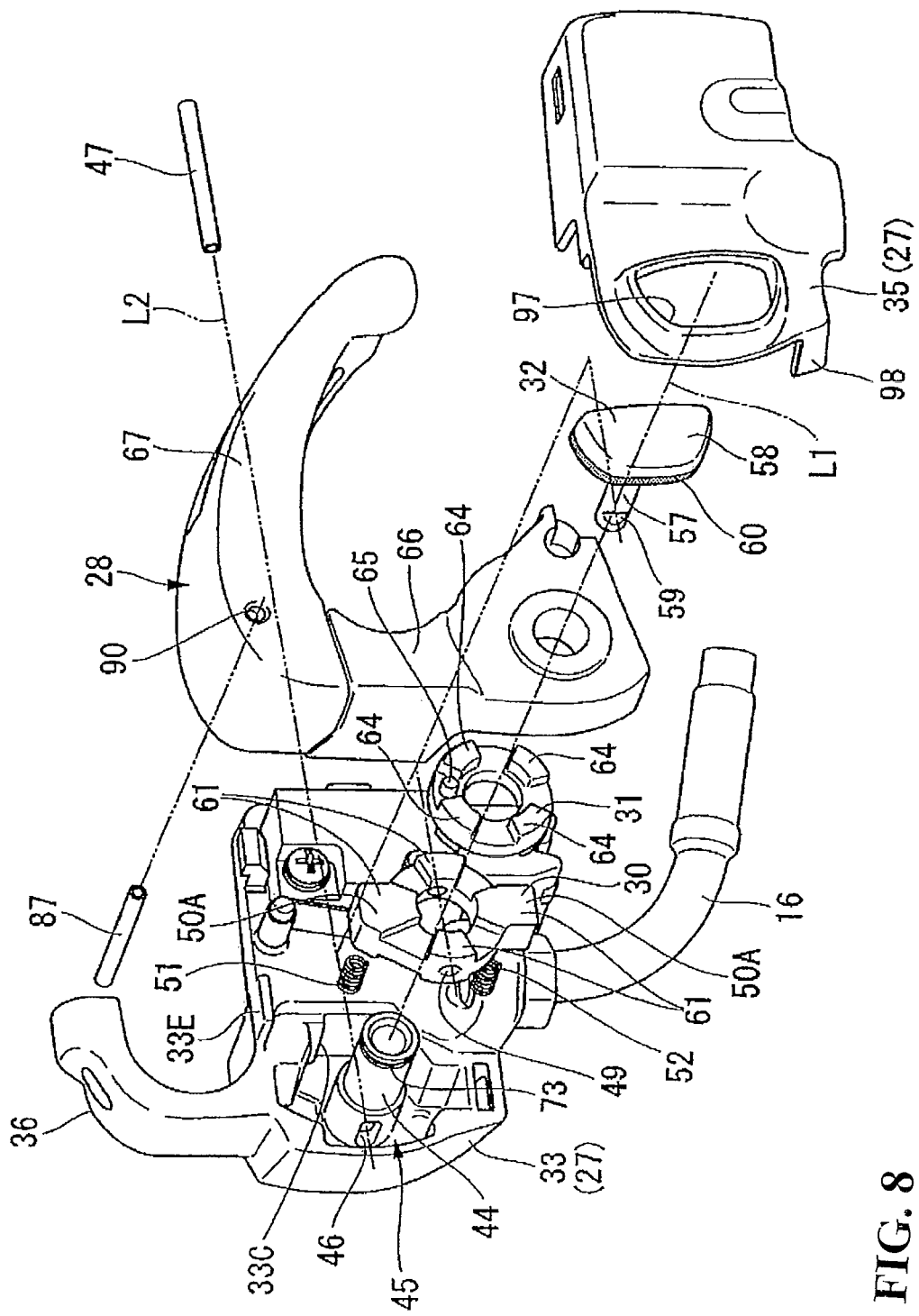
FIG. 8 is an exploded perspective view of the parking brake lever apparatus for explaining assembly thereof.
Figure 9:
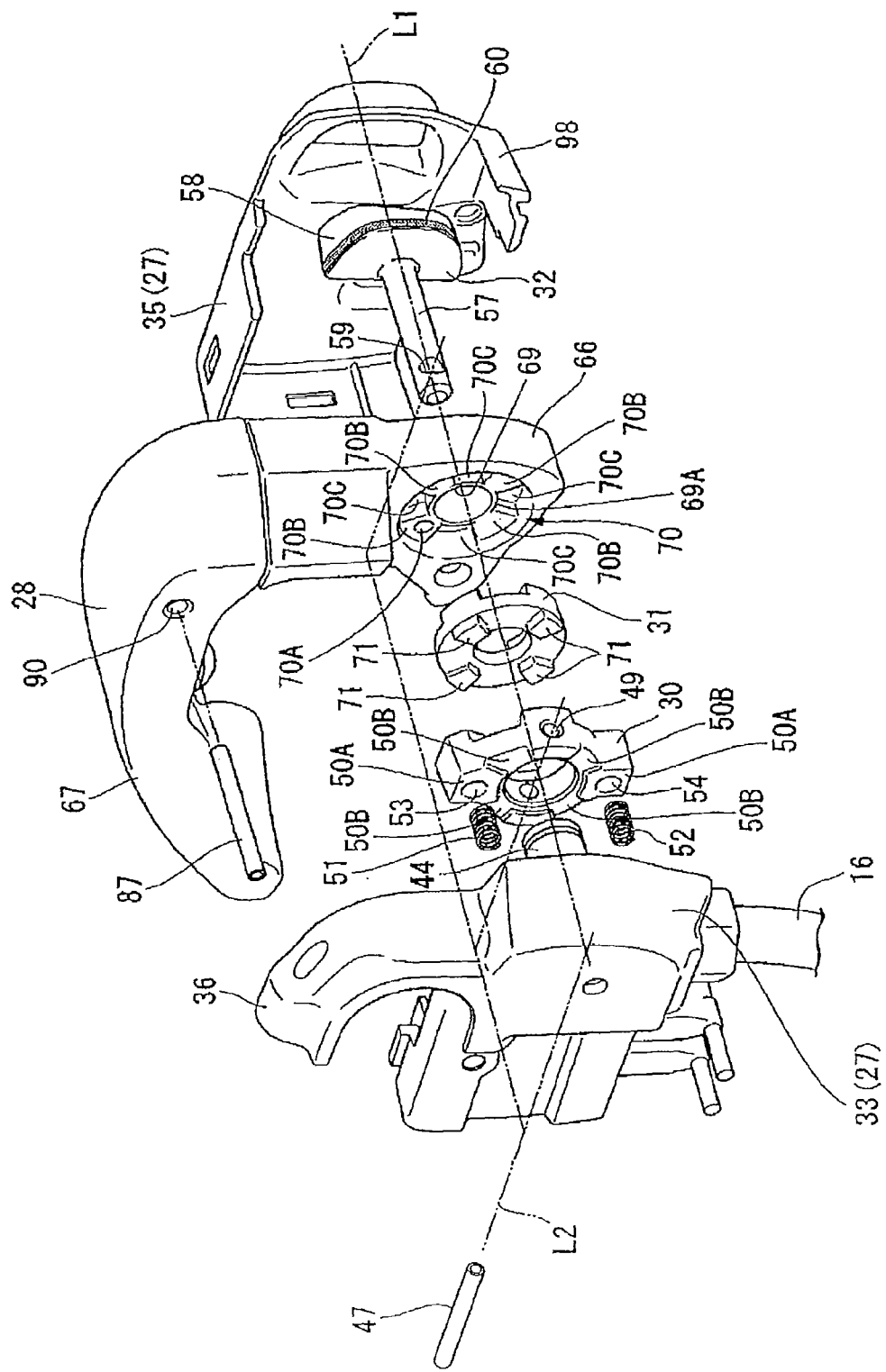
FIG. 9 is an exploded perspective view of the parking brake lever apparatus for explaining assembly thereof.

As shown in FIGS. 6 and 7, the parking brake lever apparatus 15 includes a holder member 27 to be fixed to the left handle bar 20 and a parking brake lever 28 rotatably supported by the holder member 27 and, as shown in FIGS. 8 and 9, includes a first latchet member 30, a second latchet member 31, and a release button 32, which constitute a latchet mechanism involved in the rotation of the parking brake lever 28, between the holder member 27 and the parking brake lever 28.

In the description given below, on the assumption that the parking brake lever apparatus 15 is secured to the left handle bar 20, the directions of the vehicle are used for describing the configuration of the parking brake lever apparatus 15.

First of all, the holder member 27 is formed of aluminum alloy and, as shown in FIGS. 6 to 9, includes a holder body 33 configured to rotatably support the parking brake lever 28, a split clamp half 34 configured to fix the holder body 33 to the left handle bar 20 (see FIGS. 6 and 7), and a holder cover 35 configured to be attached to the side of the holder body 33.

The holder body 33 and the holder cover 35 are formed into a laterally elongated shape in side view extending in the fore-and-aft direction under the left handle bar 20 as shown in FIGS. 6 and 7, and the split clamp portion 36 formed into an arcuate shape is formed on the top of the rear portion of the holder body 33 so as to project upward from the top of the rear portion and extend along the peripheral surface of the left handle bar 20 as shown in FIG. 10(*a*).

The split clamp portion 36 includes an abutment surface 36B which comes into abutment with the left handle bar 20 on the inner peripheral surface thereof. The upper portion of the split clamp portion 36 is directed forward above the left handle bar 20 and is formed with an upper tightening hole 37 at an end surface thereof. The holder body 33 is formed with a lower tightening hole 38 at a rear upper portion thereof, which is positioned right under the upper portion of the split clamp portion 36.

The upper tightening hole 37 and the lower tightening hole 38 are used for fixing the split clamp half 34. The split clamp half 34 is formed into a vertically elongated shape extending in the vertical direction in side view and positioned forward of the left handle bar 20, and includes an abutment surface 34B which comes into abutment with the left handle bar 20 at a substantially center in the vertical direction. In addition, the split clamp half 34 is formed with an upper through hole 41 and a lower through hole 42, which are aligned with the upper tightening hole 37 and the lower tightening hole 38, in the upper portion and the lower portion thereof, respectively.

As shown in FIG. 11(*a*), the split clamp half 34 is fixed to the holder body 33 with the left handle bar 20 positioned therebetween with bolts 39, 40 inserted through the upper through hole 41 and the lower through hole 42 and screwed into the upper tightening hole 37 and the lower tightening hole 38. Accordingly, the holder body 33 is fixed to the left handle bar 20.

Figure 11A:
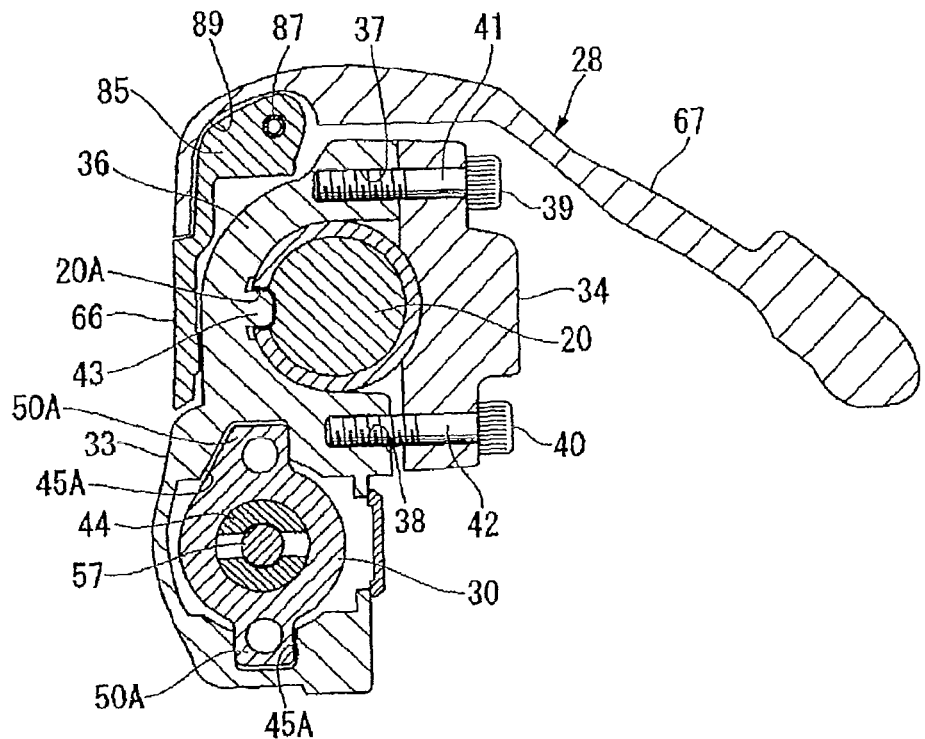
Figure 11B:
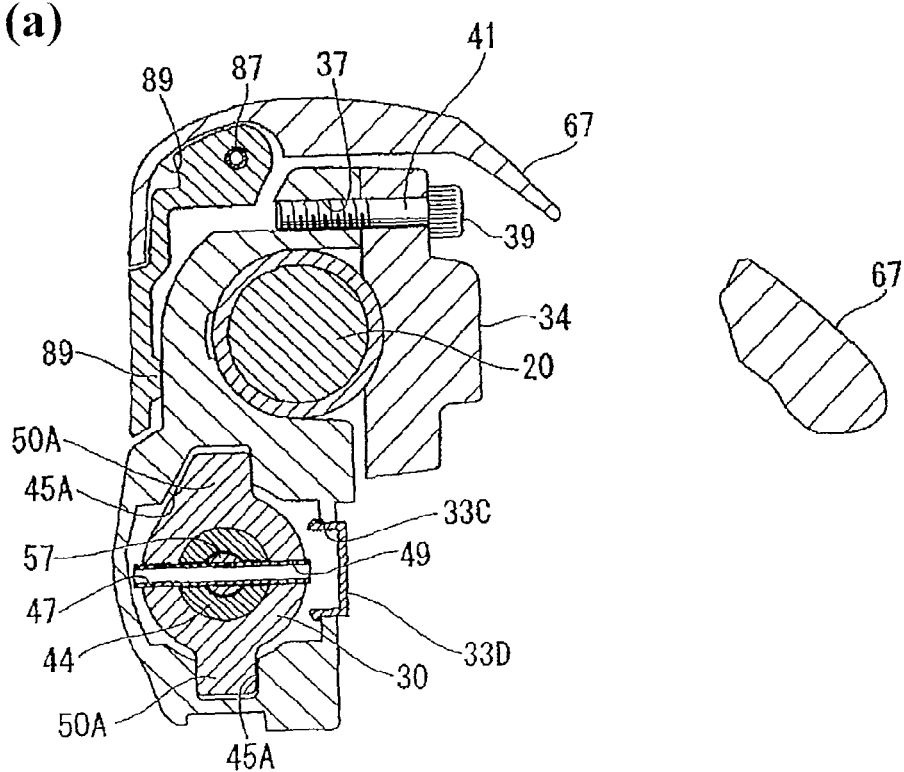
Figure 12:
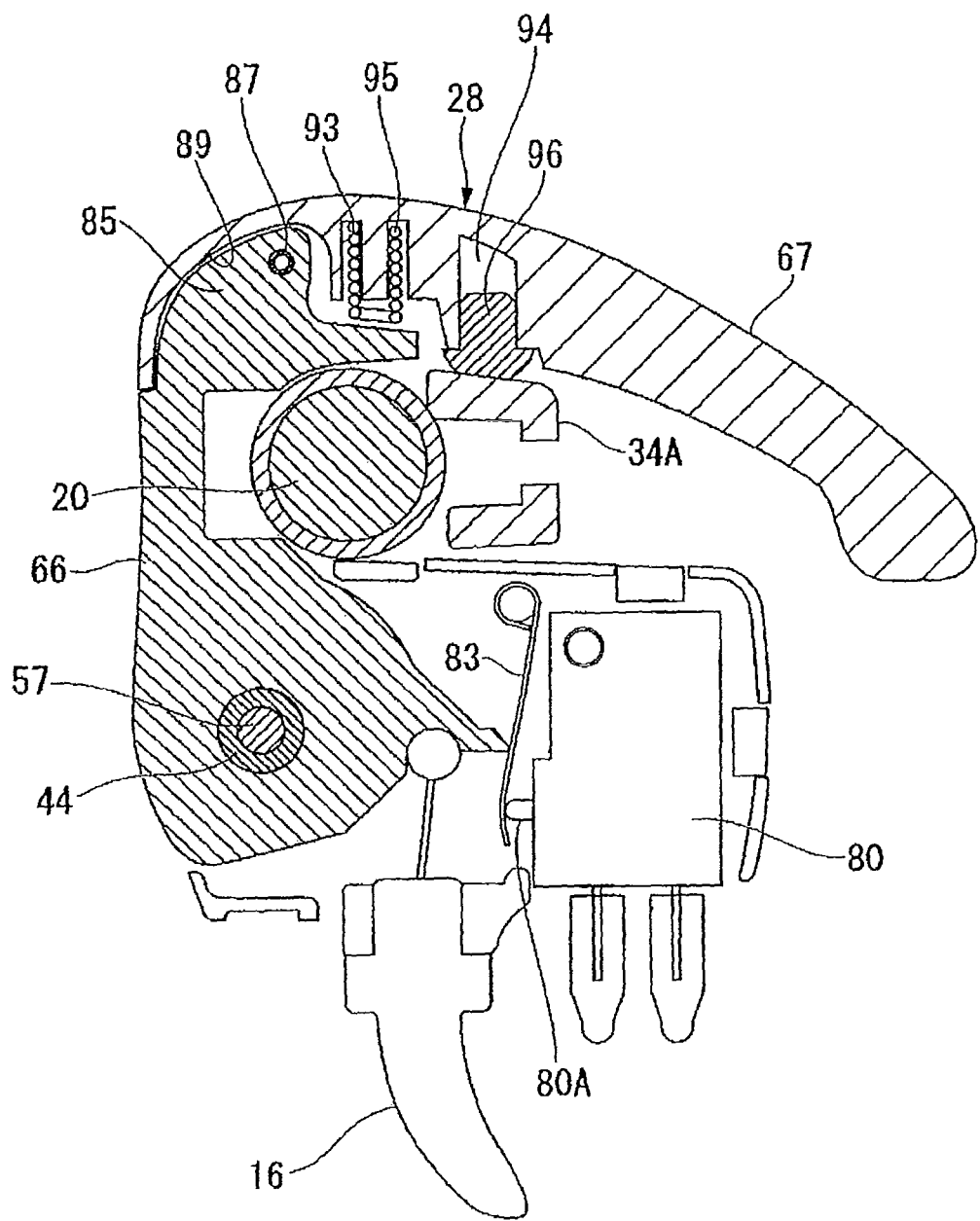
FIG. 12 is a cross-sectional view taken along the line c-c in FIG. 3.

The split clamp half 34 is integrally formed with a protruded portion 34A which protrudes sideward as shown in FIG. 10(*b*). The protruded portion 34A is set to have vertical height lower than the level where the upper through hole 41 of the split clamp half 34 is formed, extends along the axial direction of the left handle bar 20, and is formed to be hollow in the interior thereof as shown in FIG. 12, which is a cross-sectional view taken along the c-c line in FIG. 3 (a cross-sectional view inside the a-a line in the width direction, which is shown in FIG. 11(*a*)). FIG. 10(*b*) is a drawing of the holder body 33 shown in FIG. 10(*a*) viewed from the front (FR).

Figure 10A:
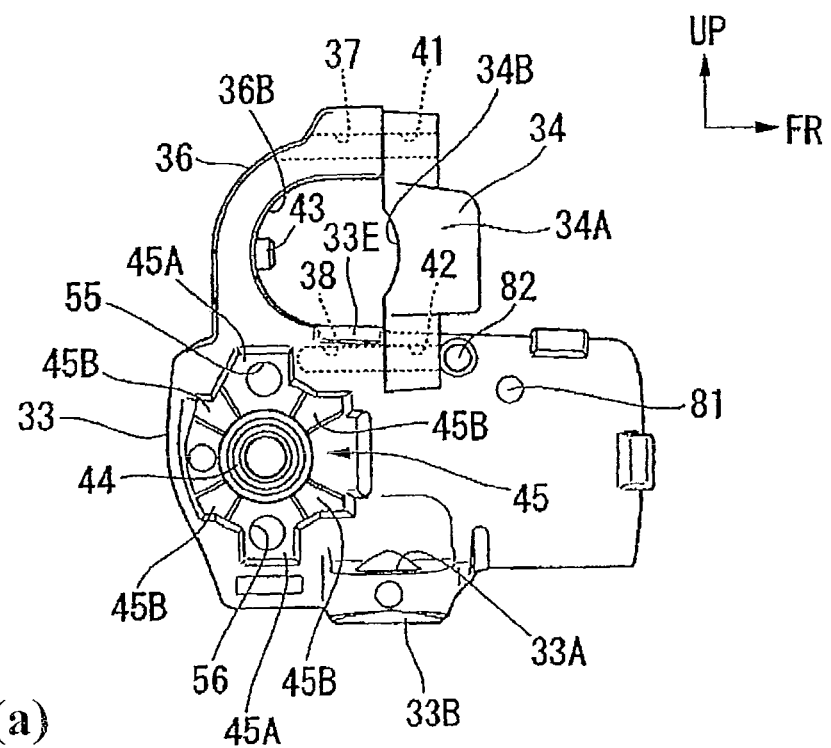
FIGS. 10(a) and 10(b) illustrate a holder member of the parking brake lever apparatus.
Figure 10B:
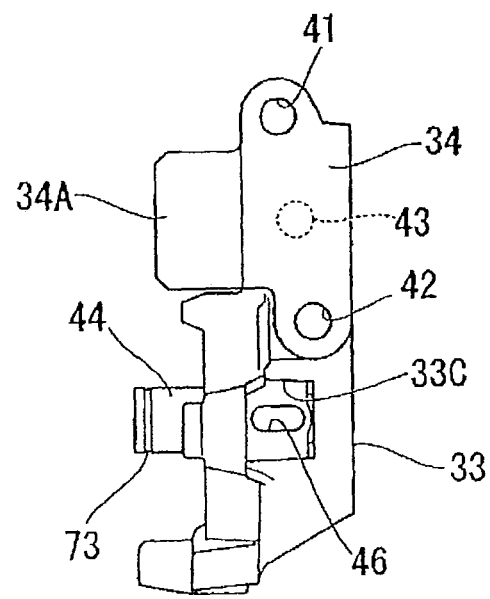

As shown in FIG. 11(*a*), a cylindrical small projecting strip 43 projecting toward the left handle bar 20 is formed on the inner peripheral surface of the split clamp portion 36 at substantially the center thereof in the vertical direction. The small projecting strip 43 is engaged with an engaging hole 20A formed in the left handle bar 20. The small projecting strip 43 and the engaging hole 20A serve to facilitate the axial and circumferential positioning of the holder body 33 with respect to the left handle bar 20. As shown in FIG. 7 and FIG. 10(a), a stopper rib 33E projecting toward the parking brake lever 28 is formed on the holder body 33 above the lower tightening hole 38. The stopper rib 33E serves to control the rotation of the parking brake lever 28, and will be described later in detail.

As shown in FIGS. 8, 9, 10(a) and 10(b), a hollow cylindrical rotating shaft 44 formed of iron is provided by casting on the holder body 33 under the split clamp portion 36 so as to extend from the side surface of the holder body 33 toward the parking brake lever 28, in other words, so as to extend along the axial direction of the left handle bar 20.

The rotating shaft 44, serving to support the parking brake lever 28, is formed with an elongated hole 46 on a proximal (root) side thereof so as to extend along the axial direction thereof and a groove 73 extending along the circumferential direction thereof on the peripheral surface on the distal end side thereof as shown in FIG. 8. The elongated hole 46 is configured to allow insertion of a connecting shaft 47 for joining the first latchet member 30 and the release button 32 as shown in FIGS. 8 and 9, and the groove 73 allows engagement of a C-clip 74 for positioning the parking brake lever 28 and preventing the same from coming off as shown in FIG. 7. Here, in FIGS. 8 and 9, reference sign L2 designates an assembly line indicating the direction of assembly of the connecting shaft 47, and illustration of the C-clip 74 is omitted in FIGS. 8 and 9 for the sake of convenience of illustration. The holder body 33 is formed with a window portion 33C in a front surface of the lower portion thereof for exposing the elongated hole 46 as show in FIG. 10(b), so that the connecting shaft 47 is allowed to be inserted into the elongated hole 46 through the window portion 33C along the assembly line L2. The window portion 33C is configured to be attached with a cap 33D after assembly as shown in FIG. 11(a).

The holder body 33 in the periphery of the rotating shaft 44 is formed with a first latchet accommodating depression 45 which is depressed from the side surface of the holder body 33 on the side where the parking brake lever 28 is supported toward the outside surface of the holder body 33 as shown in FIG. 10(a). The first latchet accommodating depression 45 is configured to accommodate the first latchet member 30, described later. The first latchet accommodating depression 45 is formed with projections 45B projecting from the bottom of the first latchet accommodating depression 45, and the projections 45B extend so as to connect the peripheral surface of the rotating shaft 44 to the edge portion of the first latchet accommodating depression 45. A plurality (four to be more precise) of the projections 45B are formed at regular intervals in the circumferential direction of the rotating shaft 44. With the formation of the projections 45B as described above, securement of the strength and rigidity of the holder body 33 which pivotally supports the parking brake lever 28 is achieved.

In addition, the upper portion and the lower portion of the first latchet accommodating depression 45 are formed so as to extend upward and downward, respectively, radially outward of the rotating shaft 44, so that the upper portion and the lower portion of the first latchet accommodating depression 45 are formed with outer peripheral depressions 45A having substantially an angular C-shape extending continuously from the first latchet accommodating depression 45.

The holder body 33 is formed with a switch mounting hole 81 at a position forward of the rotating shaft 44 so as to penetrate through the side surface thereof as shown in FIG. 10(a), and an indication switch 80 is secured to the switch mounting hole 81 with a screw as shown in FIG. 7. The indication switch 80 includes a button 80A (see FIG. 7) projecting toward the rotating shaft 44, and the button 80A is configured to be capable of protruding and retracting. Therefore, the indication switch 80 is configured to be capable of detecting whether the button 80A is pressed or not. The holder body 33 is formed with a cylindrical movable strip supporting portion 82 on a side surface thereof at a position between the rotating shaft 44 and the indication switch 80 so as to project toward the parking brake lever 28. The movable strip supporting portion 82 supports thereon a leaf-spring-type movable strip 83 (see FIG. 7). The leaf-spring-type movable strip 83 extends in the vertical direction rearward of the indication switch 80, comes into abutment with the button 80A at the lower portion thereof, and is pivotable about the movable strip supporting portion 82.

As shown in FIGS. 7 and 10(a), the holder body 33 is also formed with an opening 33A for introducing an inner cable 16A of the parking brake cable 16 into the holder body 33 and a cable fixing portion 33B for fixing a cable outer 16B of the inner cable 16A to the holder body 33 at positions below the rotating shaft 44.

Figure 13:
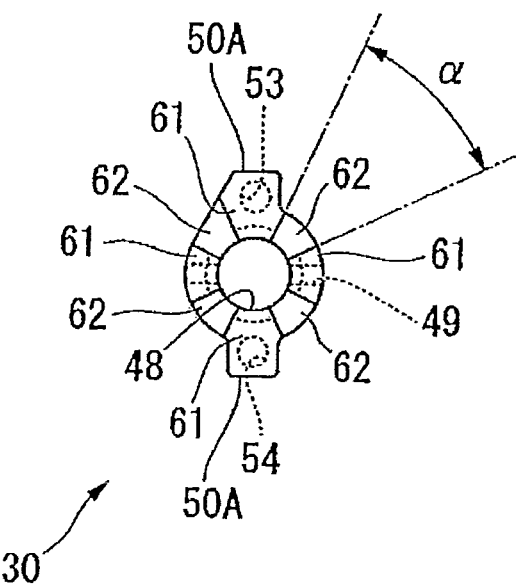
FIG. 13 shows a first latchet member of the parking brake lever apparatus viewed from the side of the parking brake lever.

On the rotating shaft 44 of the holder body 33 of the holder member 27 as described above, first of all, the first latchet member 30 shown in FIGS. 8, 9, and 13 is fitted. In FIGS. 8 and 9, reference sign L1 designates an assembly line indicating the direction of assembly of the first latchet member, and this assembly line also indicates the direction of assembly of the second latchet member 31 and the release button 32, described later.

The first latchet member 30 is formed of polyacetal (POM) having a high creep resistance, is formed into a disk shape as shown in FIG. 13, and is formed at the center thereof with a through hole 48 for allowing the insertion of the rotating shaft 44 along the assembly line L1. The first latchet member 30 is also formed with a connecting through hole 49 extending in the direction orthogonal to the axial direction of the rotating shaft 44 and penetrating therethrough as shown in FIGS. 8 and 9 as well. The first latchet member 30 is connected to the rotating shaft 44 with the connecting shaft 47 inserted through the connecting through hole 49 as shown in FIG. 11(b) and, as described above, the connecting shaft 47 is inserted into the elongated hole 46 along the assembly line L2 from the window portion 33C formed in the holder body 33 shown in FIG. 8. Then, the first latchet member 30 connected to the rotating shaft 44 with the connecting shaft 47 is brought into a state of being movable in the axial direction of the rotating shaft 44 within a range of the elongated hole 46 in the longitudinal direction. More specifically, the connecting shaft 47 connects the release button 32 to the rotating shaft 44 together with the first latchet member 30 and allows the first latchet member 30 and the release button 32 to move integrally with each other, which will be described in detail later.

As shown in FIGS. 8 and 9, the outline of the first latchet member 30 is substantially the same as the shape of the first latchet accommodating depression 45 formed on the holder body 33, so that the first latchet member 30 fitted on the rotating shaft 44 is accommodated in the first latchet accommodating depression 45 as being engaged therein. Here, the first latchet member 30 is formed with depressions 50B on the surface on the side of the holder body 33 in the periphery of the through hole 48 so as to be depressed from the holder body 33 toward the opposite side as shown in FIG. 9, and the depressions 50B serve to compensate the projections 45B formed on the side of the holder body 33. The depressions 50B are formed on the periphery of the through hole 48. A plurality (four to be more precise) of the depressions 50B are formed at regular intervals in the circumferential direction of the through hole 48, and the intervals are the same as those of the projections 45B.

The width of the depressions 50B in the circumferential direction of the through hole 48 is set to be slightly wider than the width of the projections 45B in the circumferential direction of the rotating shaft 44, so that the depressions 50B and the projections 45B are engaged with clearances. Therefore, the movement of the first latchet member 30 along the direction of the axis of the rotating shaft 44 within the range of the elongated hole 46 in the longitudinal direction is achieved smoothly.

The first latchet member 30 is formed with radial projections 50A, 50A at the upper portion and the lower portion thereof so as to extend radially outward of the through hole 48 as shown in FIG. 9. The radial projections 50A, 50A engage the outer peripheral depressions 45A formed on the holder body 33, so that the first latchet member 30 is restricted from rotating in the circumferential direction of the rotating shaft 44.

The radial projections 50A, 50A are formed with spring engaging depressions 53, 54 (see FIG. 9) for engaging springs 51, 52 as energizing members shown in FIGS. 8 and 9, and the springs 51, 52 engage the spring engaging depressions 53, 54. The springs 51, 52 are provided between the first latchet member 30 and the holder body 33 in a compressed state, so that the first latchet member 30 is always energized toward the parking brake lever 28. As shown in FIG. 10(*a*), the outer peripheral depressions 45A of the first latchet accommodating depression 45 are formed with spring receiving depressions 55, 56 which serve as bearing surfaces of the springs 51, 52. As shown in FIG. 13, the radial projections 50A, 50A formed on the upper portion and the lower portion of the first latchet member 30 are different in shape from each other so as to avoid assembling reversely by mistake.

The first latchet member 30 is formed with a first latchet teeth 61 on the surface on the side of the parking brake lever 28 in the periphery of the through hole 48 so as to project toward the parking brake lever 28 as shown in FIGS. 8 and 13.

The first latchet teeth 61 are formed into a fan shape when viewed in the direction of the axis of the rotating shaft 44, and the end surfaces thereof in the direction of the axis are formed to be flat. The four first latchet teeth 61 are formed at regular intervals (at every 90° to be more precise) on a concentric circle radially outward of the through hole 48, and troughs 62 as shown in FIG. 13 are formed between adjacent first latchet teeth 61. The circumferential width of the troughs 62 with respect to the rotating shaft 44 is 40°.

Subsequently, the parking brake lever 28 having the second latchet member 31 integrally mounted thereon is fitted on the rotating shaft 44 of the holder body 33 at a position adjacent to the first latchet member 30 as described above as shown in FIGS. 8 and 9.

First of all, the parking brake lever 28 is rotatably supported at one end thereof by the holder body 33 as shown in FIG. 6, and includes a handle rear arm portion 66 extending in the vertical direction rearward of the left handle bar 20 and a handle upper arm portion 67 mounted at one end thereof to the upper portion of the handle rear arm portion 66 and extending toward the front above the left handle bar 20. In other words, the parking brake lever 28 is arranged so as to embrace the left handle bar 20.

Figure 15A:
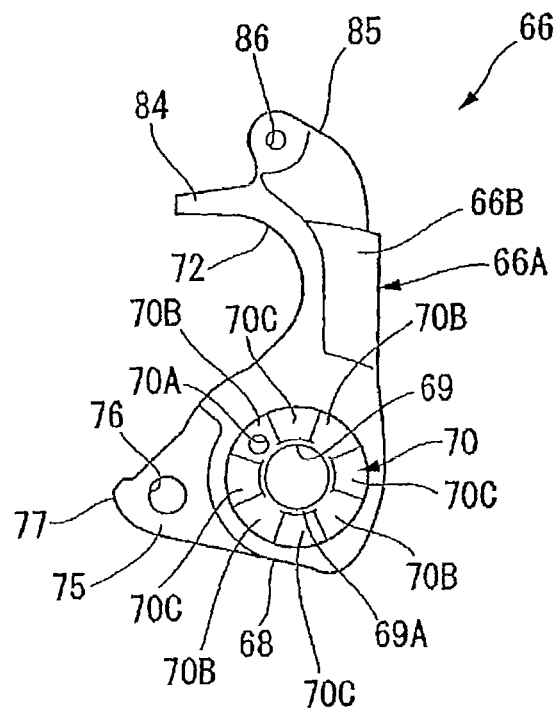
FIGS. 15(a) and 15(b) illustrate a handle rear arm portion which constitutes the parking brake lever of the parking brake lever apparatus.
Figure 15B:
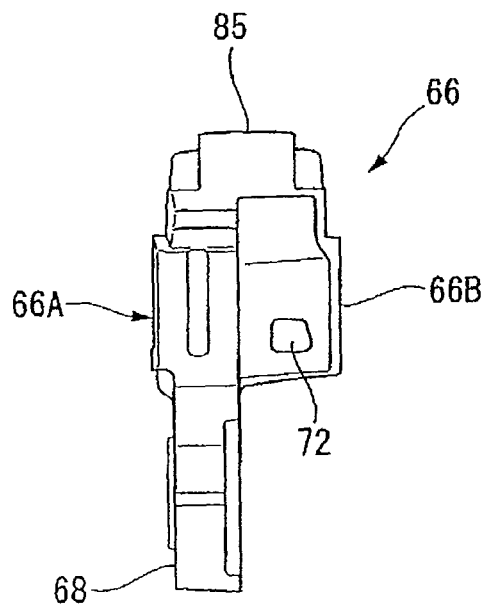

The handle rear arm portion 66 includes an arm body 66A extending in the vertical direction rearward of the left handle bar 20 and a front cover portion 66B (FIG. 15(*a*)) provided on the upper portion of the arm body 66A so as to extend toward the holder body 33 and covering the split clamp portion 36 of the holder body 33 from the front, and a front extending portion 68 formed on the lower portion of the arm body 66A so as to extend toward the front under the left handle bar 20 as shown in FIGS. 7 and 15. The front cover portion 66B is provided with a projecting stopper projection 72 on the surface on the side of the split clamp portion 36 as shown in FIG. 15(*b*). The stopper projection 72 comes into abutment with an outer surface of the split clamp portion 36 of the holder body 33.

The front extending portion 68 is formed with a rotating shaft insertion hole 69 which allows insertion of the rotating shaft 44, and the front extending portion 68 is formed with a second latchet accommodating depression 70 on the side of the first latchet member 30 in the periphery of the rotating shaft insertion hole 69 so as to be depressed from the side surface of the front extending portion 68 as shown in FIGS. 9 and 15(*a*).

The second latchet accommodating depression 70 is formed with an annular bearing projection 69A on the bottom surface thereof so as to project from the edge of the rotating shaft insertion hole 69 toward the holder body 33 as shown in FIG. 9, and the bearing projection 69A contributes to enhance the supporting rigidity of the parking brake lever 28 with respect to the rotating shaft 44. Then, the second latchet accommodating depression 70 is formed with lever-side teeth 70B in the periphery of the bearing projection 69A so as to project from the bottom thereof. The lever-side teeth 70B extend so as to connect the peripheral surface of the bearing projection 69A to the edge portion of the second latchet accommodating depression 70, and a plurality (four to be more precise) of the lever-side teeth 70B are formed at regular intervals in the circumferential direction of the rotating shaft 44. A distal end of the lever-side teeth 70B continues to be flush with the distal end surface of the bearing projection 69A, and lever-side troughs 70C are formed between adjacent lever-side teeth 70B. One of the lever-side teeth 70B positioned on the upper side is formed with a positioning depression 70A depressed from the side surface.

The handle rear arm portion 66 includes the second latchet member 31 integrally therewith by accommodating the second latchet member 31 in the second latchet accommodating depression 70.

Figure 14:
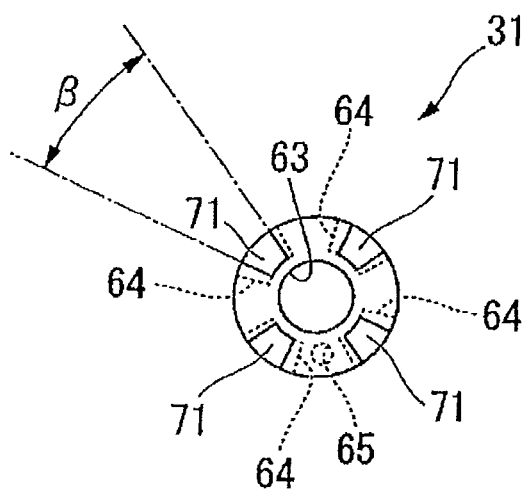
FIG. 14 is a drawing of a second latchet member of the parking brake lever apparatus viewed from the side of the first latchet member.

The second latchet member 31 is formed of polyacetal (POM) having a high creep resistance, is formed into a disk shape as shown in FIG. 14, and is formed at the center thereof with a through hole 63 for allowing the insertion of the rotating shaft 44. The second latchet member 31 is formed with a lever engaging teeth 64 on the surface on the side of the parking brake lever 28 in the periphery of the through hole 63 so as to project toward the parking brake lever 28 as shown in FIG. 8.

The lever engaging teeth 64 are formed into a fan shape when viewed in the direction of the axis of the rotating shaft 44, and the four lever engaging teeth 64 are formed at regular intervals (at every 90° to be more precise) on a concentric circle radially outward of the through hole 63 as shown in FIG. 8. Then, the width of the lever engaging teeth 64 in the circumferential direction of the through hole 63 is set to be substantially the same as the width of the lever-side troughs 70C in the circumferential direction of the rotating shaft insertion hole 69, and the radially inner sides of the lever engaging teeth 64 are removed so as to avoid the bearing projection 69A formed on the handle rear arm portion 66. With the lever engaging teeth 64 in this configuration accommodated in the lever-side troughs 70C, the handle rear arm portion 66 includes the second latchet member 31 mounted integrally thereon, and second latchet member 31 is formed with a small projecting strip 65 to be engaged with the positioning depression 70A on the upper side of the side surface thereof on the side of the parking brake lever 28 between the adjacent lever engaging teeth 64 as shown in FIG. 8.

The second latchet member 31 is formed with second latchet teeth 71 on the surface on the side of the first latchet member 30 in the periphery of the through hole 63 so as to project toward the first latchet member 30 as shown in FIGS. 9 and 14.

The second latchet teeth 71 are formed into a fan shape when viewed in the direction of the axis of the rotating shaft 44, and the end surfaces in the direction of the axis thereof are formed to be flat. The four second latchet teeth 71 are formed at regular intervals (at every 90° to be more precise) on a concentric circle radially outward of the through hole 63. In addition, the width (circumferential width) of the second latchet teeth 71 in the circumferential direction of the through hole 63 is set to be narrower than the width (circumferential width) of the troughs 62 formed between the first latchet teeth 61 in the circumferential direction of the through hole 48. More specifically, an angle β formed between both ends of the second latchet tooth 71 shown in FIG. 14 with the center of the through hole 63 is 30°, and an angle α formed between both ends of the trough 62 shown in FIG. 13 with the center of the through hole 48 is 40°, which is smaller by approximately 10°.

The handle rear arm portion 66 having the second latchet member 31 as described above integrally fitted thereto is inserted in such a manner that the flat portions at the distal ends of the second latchet teeth 71 of the second latchet member 31 are pressed against the flat portions at the distal ends of the first latchet teeth 61 of the first latchet member 30, and causes the first latchet member 30 energized by the springs 51, 52 to be retracted toward the holder body 33.

In order to hold the position that the handle rear arm portion 66 causes the first latchet member 30 to be retracted toward the holder body 33 as described above, the C-clip 74 (see FIG. 7) engages the groove 73 formed on the rotating shaft 44.

Here, in a state in which the handle rear arm portion 66 brings the stopper projection 72 into abutment with the left handle bar 20, that is, in a state in which the handle rear arm portion 66 is in the upright position as shown in FIG. 6, the flat portions at the distal ends of the second latchet teeth 71 are capable of sliding on the flat surfaces at the distal ends of the first latchet teeth 61. In FIG. 7, the parking brake lever 28 indicated by a doubled-dashed chain line is in a rotated state Lo in which the parking brake lever 28 is rotated toward the upper rear. When the handle rear arm portion 66 is rotated to this rotated state Lo, and the flat portions at the distal ends of the second latchet teeth 71 of the second latchet member 31 move away from the flat portions of the distal ends of the first latchet teeth 61 of the first latchet member 30 and oppose the troughs 62 of the first latchet member 30, the first latchet member 30 projects toward the second latchet member 31 by an energizing force of the springs 51, 52, so that the second latchet teeth 71 engage the troughs 62.

In the description given above, the width in the circumferential direction of the second latchet teeth 71 is set to be smaller than the width in the circumferential direction of the troughs 62 formed on the first latchet member 30. This is to minimize friction between the surfaces of the respective teeth portions of the first latchet member 30 and the second latchet member 31 thereby achieving smooth engagement between the second latchet teeth 71 and the troughs 62 with the provision of clearances. Therefore, the angle is not limited to the angle of 10° set in the embodiment and may be changed as needed as long as the smooth engagement between the second latchet teeth 71 and the troughs 62 is achieved. However, the width in the circumferential direction of the second latchet teeth 71 is preferably set to be smaller than the width in the circumferential direction of the troughs 62 formed on the first latchet member 30 by 5° or more.

The handle rear arm portion 66 fitted on the rotating shaft 44 is formed with a front extending arm portion 75 in the front of the front extending portion 68 so as to extend forward from the rotating shaft insertion hole 69 as shown in FIGS. 7 and 15(a).

The front extending arm portion 75 is formed with a cable connecting hole 76 for the connection with the parking brake cable 16, and the inner cable 16A of the parking brake cable 16 led from the opening 33A of the holder body 33 is joined with the cable connecting hole 76. Therefore, when the handle rear arm portion 66 pivotally supported by the rotating shaft 44 is rotated rearward so as to assume the rotated state Lo shown in FIG. 7, the inner cable 16A is pulled and hence the parking brake caliper 14 presses the brake disk 12 from both sides, so that the second latchet teeth 71 engage the troughs 62 in this state, and the locked state of the parking brake lever apparatus 15 is maintained. In other words, in the rotated state Lo, the parking brake lever apparatus 15 is in the locked state.

The front extending arm portion 75 is relatively tapered toward the front, and includes at a distal end thereof with a switch abutment portion 77 which is capable of coming into abutment with the button 80A of the indication switch 80 as shown in FIG. 7. The switch abutment portion 77 is arranged so as to come into contact with the button 80A with the intermediary of the movable strip 83 provided on the holder body 33 when the handle rear arm portion 66 takes the upright position rearward of the left handle bar 20 as described above, and move away from the movable strip 83 to be brought out of abutment with the button 80A in the state in which the handle rear arm portion 66 is rotated rearward. Therefore, the indication switch 80 is configured to be capable of detecting whether the parking brake lever apparatus 15 is rotated or not, and whether the parking brake lever apparatus 15 is in the locked state or in the unlocked state is displayed in the indicator 26A on the combination panel 26 on the basis of the result detected by the indication switch 80. In addition, the front extending arm portion 75 includes an abutment surface 75A which comes into abutment with the stopper rib 33E formed on the holder body 33 on the front upper portion thereof as shown in FIG. 7, and the amount of rotation of the parking brake lever 28 is limited by the abutment of the abutment surface 75A against the stopper rib 33E.

On the other hand, referring to FIG. 15(a), the handle rear arm portion 66 is formed with a plate-shaped spring seat 84 on the top of the arm body 66A so as to extend toward the front above the left handle bar 20, in other words, extend along the direction of extension of the handle upper arm portion 67. The handle rear arm portion 66 is also formed with an arm connecting portion 85 on the top of the arm body 66A so as to extend upward with respect to the spring seat 84 and curve gently toward the front as shown in FIG. 7. The arm connecting portion 85 is formed with a shaft insertion hole 86 (FIG. 15(a)), and the handle upper arm portion 67 is pivotably connected to the handle rear arm portion 66 with a connecting shaft 87 inserted through the shaft insertion hole 86.

The handle upper arm portion 67 is a portion where the operator grips for operating the parking brake lever apparatus 15 and, as shown in FIGS. 6 and 7, extends substantially straight from the top of the handle rear arm portion 66 toward the front, and includes at a front end thereof a forward-inclined portion 91 which is gently inclined downward therefrom.

The forward-inclined portion 91 reaches a level below the left handle bar 20 at the front end thereof, and covers and keeps the left handle bar 20 out of view when viewing the parking brake lever apparatus 15 from the front.

Figure 16A:
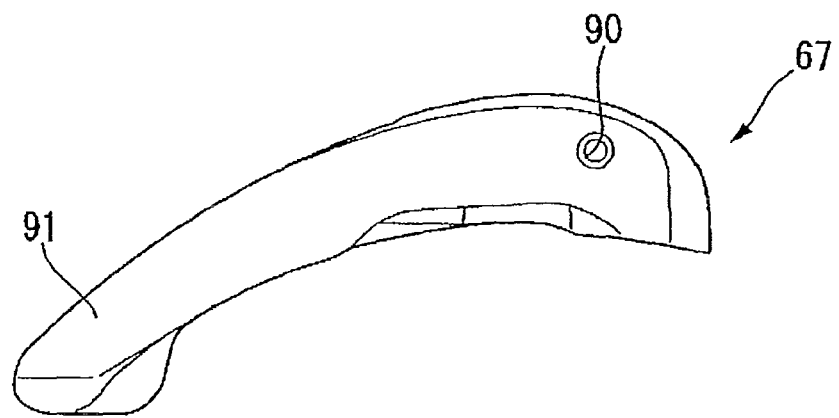
FIGS. 16(a) and 16(b) illustrate a handle upper arm portion which constitutes the parking brake lever of the parking brake lever apparatus.
Figure 16B:
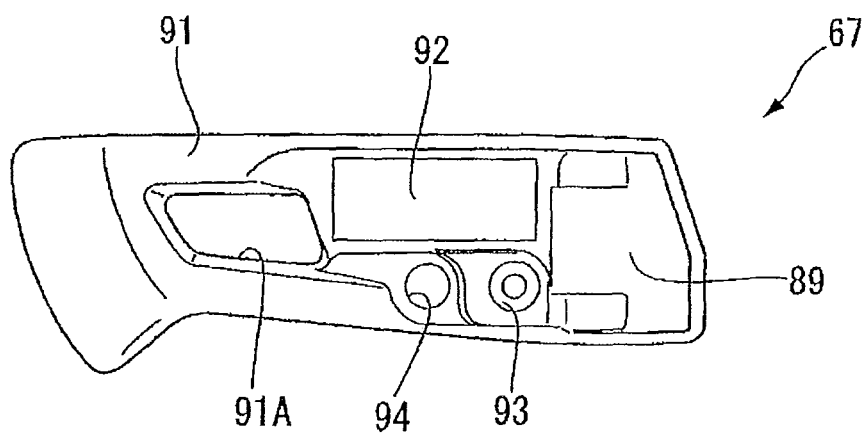

The handle upper arm portion 67 is formed of polypropylene (PP) containing glass fiber powder, and is formed to have a relatively wide width as shown in FIG. 16(b), and is set to have a sufficient width to cover the holder member 27 and the like when viewing the parking brake lever apparatus 15 from above as shown in FIGS. 3 and 4. A finger hole 91A is provided for engaging the operator's finger formed in the forward-inclined portion 91.

The inside of the handle upper arm portion 67 is formed with depressions at right places, and includes an accommodating portion 89 for covering the arm connecting portion 85 of the handle rear arm portion 66 and having a rear inner surface following the rear surface of the arm connecting portion 85 as shown in FIGS. 7 and 16(b).

The accommodating portion 89 is formed with a shaft insertion hole 90 which penetrates both sides thereof as shown in FIG. 16(a), so that the handle upper arm portion 67 is connected rotatably with respect to the handle rear arm portion 66 with the connecting shaft 87 inserted through the shaft insertion hole 90 in a state of covering the arm connecting portion 85 with the accommodating portion 89 (see FIG. 11). Here, the handle upper arm portion 67 is supported so as to be rotatable toward the lower front with respect to the handle rear arm portion 66. However, since the inner surface of the accommodating portion 89 on the side of the handle rear arm portion 66 comes into abutment with the rear surface of the arm connecting portion 85, the accommodating portion 89 functions as a stopper to restrict the rotation of the handle upper arm portion 67 toward the upper rear.

As shown in FIG. 16(b), the handle upper arm portion 67 is formed on the inside thereof with a holder upper accommodating depression 92 for accommodating the split clamp portion 36 and the split clamp half 34 on the side of the split clamp portion 36. The holder upper accommodating depression 92 is formed along the longitudinal direction of the handle upper arm portion 67 so as to cover the split clamp portion 36 and the split clamp half 34 in a state in which the handle rear arm portion 66 is not rotated toward the upper rear as shown in FIG. 6 or FIG. 7.

The handle upper arm portion 67 is also formed on the inside thereof with a spring accommodating annular depression 93 depressed in an annular shape on the side of the holder cover 35 and a rubber accommodating depression 94 on the front side of the spring accommodating annular depression 93. The spring accommodating annular depression 93 is formed so as to face the spring seat 84 formed on the handle rear arm portion 66 on the opposite side of the connecting shaft 87 from the accommodating portion 89 as shown in FIG. 7, and a certain extent of clearance is set between the end surface of the spring accommodating annular depression 93 and the spring seat 84.

A spring 95 set to have a height larger than the depth of the spring accommodating annular depression 93 as shown in FIGS. 7 and 12 is inserted into the spring accommodating annular depression 93, and the spring 95 is in abutment with the spring seat 84 formed on the handle rear arm portion 66 in a compressed state. Accordingly, the handle upper arm portion 67 is energized upward, but the inner surface of the accommodating portion 89 on the side of the handle rear arm portion 66 abuts against the rear surface of the arm connecting portion 85 as the stopper, so that the rotation of the handle upper arm portion 67 is restricted.

A rubber member 96 formed of resin material having a head set to have a diameter larger than the inner diameter of the rubber accommodating depression 94 is inserted into the rubber accommodating depression 94, and the rubber member 96 is in abutment with the upper portion of the protruded portion 34A of the split clamp half 34 as shown in FIGS. 7 and 12.

Subsequently, the release button 32 will be described. The release button 32 is inserted into the hollow portion of the rotating shaft 44 of the holder body 33 as shown in FIGS. 8 and 9.

The release button 32 includes a connecting shaft 57 to be inserted at one end thereof into the interior of the cylinder of the rotating shaft 44 and a button body 58 to be joined with the other end of the connecting shaft 57 as shown in FIGS. 8 and 9.

The connecting shaft 57 is movable in the rotating shaft in the axial direction within the range of the elongated hole 46 formed on the rotating shaft 44 in the longitudinal direction, and is formed with a connecting hole 59 for allowing insertion of the connecting shaft 47 (see FIG. 7, for example) at one end side, and the connecting shaft 47 is inserted into the connecting hole 59. The assembly of the connecting shaft 47 with respect to the connecting shaft 57 is achieved by inserting the connecting shaft 47 from the window portion 33C formed on the holder body 33 shown in FIG. 8 along the assembly line L2 and inserting the connecting shaft 47 into the elongated hole 46 as well as the connecting hole 59. Then, the connecting shaft 57, being also joined with the first latchet member 30, is capable of pressing the first latchet member 30 energized toward the parking brake lever 28 in turn toward the holder body 33 along the direction of the axis of the rotating shaft 44 against the energizing force of the springs 51, 52.

The button body 58 is set to have a thickness (height) to a certain extent in the direction of the axis of the connecting shaft 57, and a predetermined area of the button body 58 on the side of the connecting shaft 57 is colored differently from the distal end side thereof, so that a colored portion 60 as shown in FIG. 8 is provided.

The holder cover 35 is attached to the holder body 33 with the parking brake lever 28 integrated with the first latchet member 30 and the second latchet member 31 placed therebetween.

The holder cover 35 is formed into a laterally elongated shape corresponding to the laterally elongated shape of the holder body 33, and is formed with a release button opening 97 corresponding to the position and the shape of the button body 58 of the release button 32 as shown in FIG. 8. The holder cover 35 is also formed with a lever lower cover portion 98 at the lower rear of the release button opening 97 so as to extend toward the holder body 33. In addition, as shown in FIG. 6, the holder cover 35 is also formed with a holder-side play adjustment marking line portion 99, which serves as marks for adjusting the play of the parking brake cable 16 at the time of assembly, above the release button opening 97 on the upper portion of the side surface of the holder cover 35. The holder-side play adjustment marking line portion 99 defines a predetermined angle range in the direction of rotation of the handle rear arm portion 66 with two lines, while the handle rear arm portion 66 is formed with a lever-side play adjustment marking portion 100 at a position above the holder cover 35. Accordingly, the lever-side play adjustment marking portion 100 can be compared with the range defined by the holder-side play adjustment marking line portion 99 by rotating the handle rear arm portion 66 when assembling the parking brake lever apparatus 15, so that desirable adjustment of the play is achieved.

The release button opening 97 allows the insertion of the button body 58 of the release button 32 and exposure of the same to the outside as shown in FIG. 6, and the colored portion 60 of the button body 58 of the release button 32 is exposed from the release button opening 97 when the troughs 62 of the first latchet member 30 engage the second latchet teeth 71 of the second latchet member 31 (see FIG. 4).

Subsequently, the method of operating the parking brake lever apparatus 15 configured as described above and an action of the parking brake lever apparatus 15 in the locked state and in the unlocked state will be described using FIGS. 17 and 18 with reference also to FIGS. 2 to 5. FIGS. 17 and 18 are diagrammatic vertical cross sectional views of the parking brake lever apparatus 15.

In this embodiment, the operator is able to grip the accelerator grip 21 of the right handle bar 19 with his or her right hand R and grip the grip 24 of the left handle bar 20 with his or her left hand L as shown in FIG. 2 and, from this state, is able to operate the parking brake lever apparatus 15 as needed with his or her left hand L as shown in FIG. 3. The parking brake lever apparatus 15 is mounted on the left handle bar 20 so as to embrace the same as apparent from the configuration described above, and is configured to be rotatable in the direction indicated by an arrow B indicating the direction of rotation shown in FIG. 5, that is, in the circumferential direction of the left handle bar 20.

FIG. 3 shows a state in which the handle upper arm portion 67 of the parking brake lever 28 extends substantially straight toward the front, vertical to the direction of the axis of the left handle bar 20. In this state, the parking brake caliper 14 is in the unlocked state in which the brake disk 12 is not pressed by the parking brake caliper 14 from both sides. Here, the state in which the handle upper arm portion 67 of the parking brake lever apparatus 15 extends substantially straight, which corresponds to the unlocked state, is referred to as "unlocked position." In this unlocked position, the parking brake lever 28 is arranged on the left handle bar 20 so as to embrace the same. Therefore, compact arrangement of the parking brake lever 28 in the vehicle is achieved. Also, since the forward-inclined portion 91, which is inclined downward with respect to the upper end of the left handle bar 20 in the front of the left handle bar 20, is provided and a certain length of the handle upper arm portion 67 of the parking brake lever 28 is secured, ease of the pulling-up operation of the handle upper arm portion 67 is achieved. Also, since the parking brake lever 28 is provided on the left handle bar 20 so as to embrace the same in the unlocked position, further a compact arrangement of the parking brake lever apparatus 15 in the vehicle is achieved.

The front extending portion 68 extending to the front toward the left handle bar 20 is provided on the lower portion of the handle rear arm portion 66, and the rotating shaft 44 of the parking brake lever 28 is inserted through the front extending portion 68. Therefore, the rotating shaft 44 of the parking brake lever 28 which tends to be upsized can be mounted unobtrusively owing to the position of the rotating shaft 44 of the parking brake lever 28 below the left handle bar 20. In addition, since the handle upper arm portion 67 and the handle rear arm portion 66 are assembled with the intermediary of the spring 95 energizing the handle upper arm portion in the direction to be pulled upward, even when an object or the operator's hand is placed on the handle upper arm portion 67 by mistake, the handle upper arm portion 67 rotates downward and receives the load by the spring 95. Consequently, exertion of a heavy load on the rotating shaft 44 from above the handle rear arm portion 66 is avoided.

Referring now to FIGS. 17(a) to 17(d), the actions of the parking brake lever apparatus 15 and the latchet mechanism when the parking brake lever 28 is rotated from the unlocked position described above will be described.

Figure 17A:
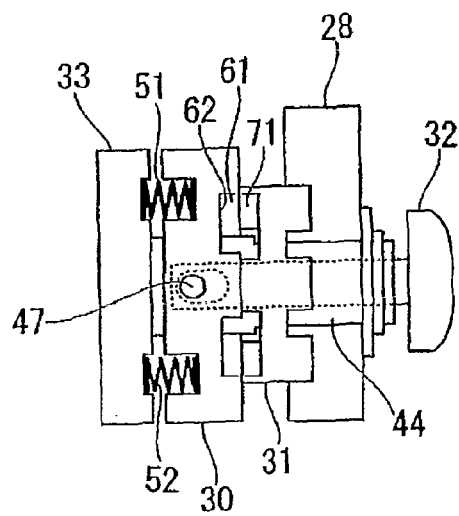
FIGS. 17(a) to 17(d) illustrate an operation for bringing the parking brake lever apparatus into a locked state.

FIG. 17(a) shows an unlocked state of the parking brake lever apparatus 15. In this state, the flat portions at the distal ends of the second latchet teeth 71 of the second latchet member 31 press against the flat portions of the distal ends of the first latchet teeth 61 of the first latchet member 30, that is a state of being in friction against each other. Accordingly, the flat portions at the distal ends of the second latchet teeth 71 are capable of sliding on the flat portions at the distal ends of the first latchet teeth 61 in association with the rotation of the parking brake lever 28.

Figure 17B:
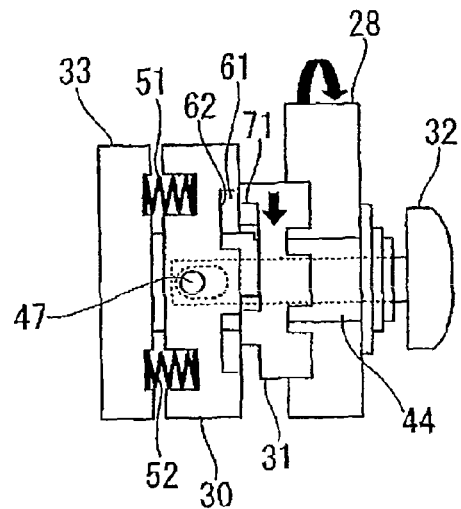

Subsequently, FIG. 17(b) shows a state in which the parking brake lever 28 is rotated. The flat portions at the distal ends of the second latchet teeth 71 of the second latchet member 31 slide on the flat portion at the distal end of the first latchet teeth 61 of the first latchet member 30, and the second latchet teeth 71 gradually move away from the first latchet teeth 61.

Figure 17C:
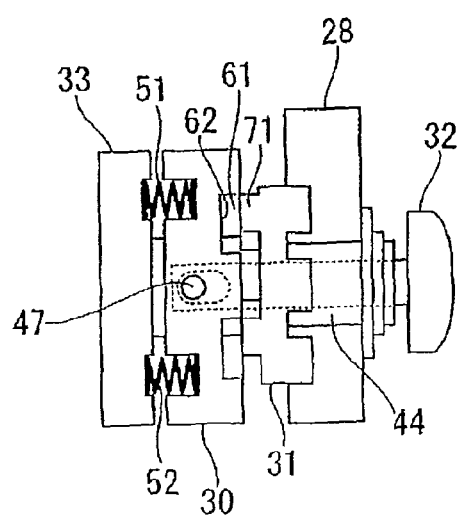

Subsequently, FIG. 17(c) shows a state in which the second latchet teeth 71 are moved completely away from the first latchet teeth 61, and the second latchet teeth 71 oppose the troughs 62 of the first latchet member 30. In this state, the springs 51, 52, which are interposed between the first latchet member 30 and the holder body 33 in a compressed state, are expanded. In this embodiment, the stopper projection 72 of the handle rear arm portion 66 is moved away from the left handle bar 20, and the handle upper arm portion 67 assumes an inclined state as shown in FIG. 6.

Figure 17D:
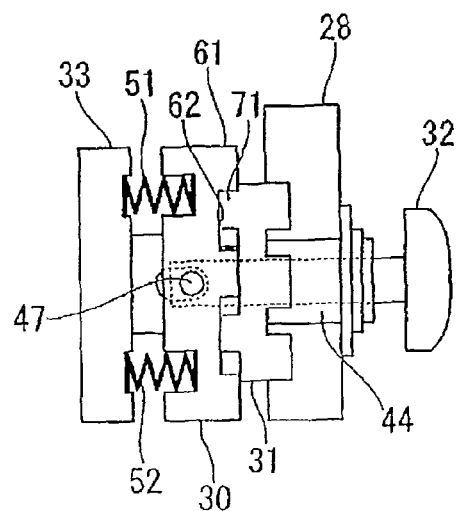

FIG. 17(d) shows a state in which the springs 51, 52 are expanded, and the first latchet member 30 is moved toward the parking brake lever 28 along the direction of the axis of the rotating shaft 44. In this state, the second latchet teeth 71 engage the troughs 62 between the adjacent first latchet teeth 61, and the first latchet teeth 61 and the second latchet teeth 71 engage with each other. Therefore, when an attempt is made to rotate the parking brake lever 28, the first latchet member 30 is also about to move due to the engagement between the second latchet teeth 71 and the first latchet teeth 61. However, since the first latchet member 30, the radial projection 50A, and the outer peripheral depressions 45A of the holder body 33 are engaged with each other, the first latchet member 30 cannot rotate, and the rotation of the parking brake lever 28 in the fore-and-aft direction is also restrained. Therefore, as shown in FIG. 7, the parking brake lever 28 is restrained from rotating in the fore-and-aft direction in the popped up state of being rotated toward the upper rear and is kept in the state of pulling the parking brake cable 16. Consequently, the state in which the brake disk 12 is pressed by the parking brake caliper 14 from both sides is maintained, and hence the locked state of the parking brake lever apparatus 15 is maintained.

In the state shown in FIG. 17(d), the release button 32 also moves along the direction of the axis of the rotating shaft 44. In this case, the button body 58 of the release button 32 projects from the release button opening 97 of the holder cover 35. In this case, the colored portion 60 provided on the button body 58 projects from the release button opening 97 as shown in FIG. 4 and hence is exposed to the outside, which urges the operator to recognize the operating state of the parking brake lever apparatus 15.

Subsequently, FIG. 4 shows the popped up state in which the parking brake lever 28 is rotated and hence the handle upper arm portion 67 is rotated to the upper rear, which is a locked state in which the parking brake caliper 14 presses the brake disk 12 from both sides. Here, the state in which the parking brake lever apparatus 15 is rotated, which corresponds to the locked state, is referred to as "locked position." In this locked position, even when the operator presses the parking brake lever 28 to the forward and downward by mistake, the parking brake lever 28 is prevented from being rotated about the rotating shaft 44 owing to the latchet mechanism. In addition, in the case where an object or the operator's hand is placed on the handle upper arm portion 67 from above by mistake, the handle upper arm portion 67 is rotated downward to receive the load by the spring 95. Therefore, exertion of a heavy load on the rotating shaft 44 from above the handle rear arm portion 66 is avoided. Since the parking brake lever 28 is positioned to project upward in comparison with the unlocked position in which the parking brake lever 28 is compactly arranged, the locked state is made further recognizable.

Figure 18A:
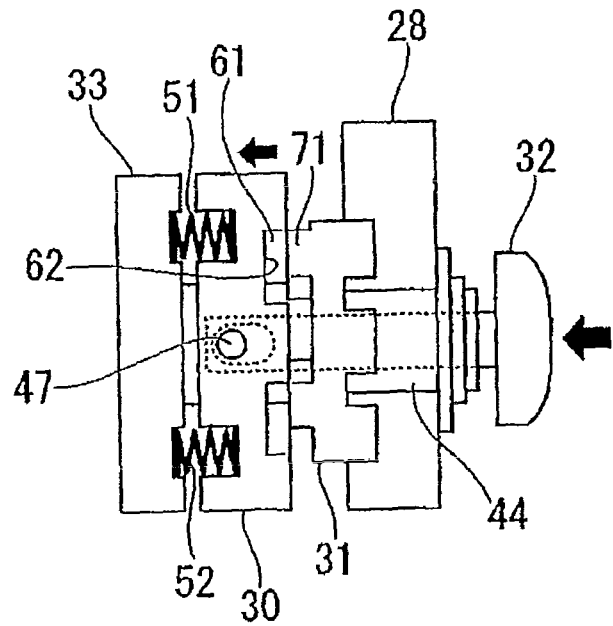
FIGS. 18(a) and 18(b) illustrate an operation for bringing the parking brake lever apparatus into an unlocked state.
Figure 18B:
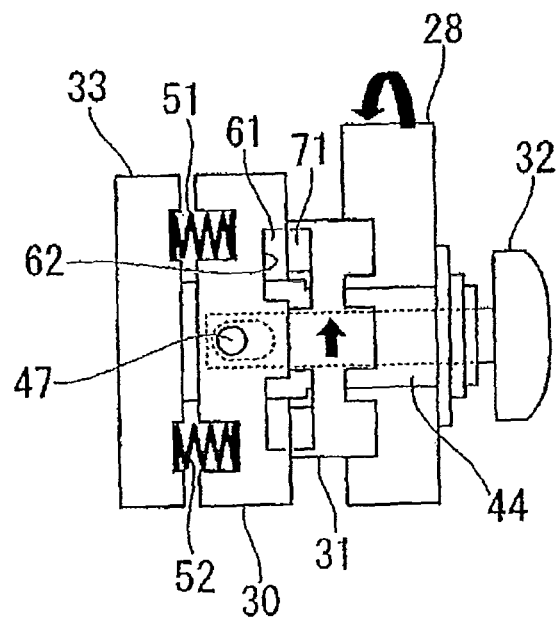

Referring now to FIGS. 18(a) and 18(b), the actions of the parking brake lever apparatus 15 and the latchet mechanism when the parking brake lever 28 is operated to the unlocked position from the locked position described above will be described.

FIG. 18(a) shows a state in which the release button 32 projecting from the release button opening 97 of the holder cover 35 shown in FIG. 17(d) is pressed toward the holder body 33. In this state, the first latchet member 30 is moved along the rotating shaft 44 toward the holder body 33, and the engaged state between the second latchet teeth 71 and the troughs 62 is released. In this state, the rotation of the parking brake lever 28 is allowed. Here, the circumferential width β (see FIG. 14) of the second latchet teeth 71 is smaller than the circumferential width α (see FIG. 13) of the troughs 62 of the first latchet member 30. Therefore, the parking brake lever 28 is rotatable rearward by an amount corresponding to the difference of the circumferential width. When releasing the parking brake lever 28, if the operator presses the release button 32 while rotating the parking brake lever 28 rearward, the release button 32 can be moved in a state in which the surfaces of the teeth portions of the first latchet member 30 and the second latchet member 31 are not in friction against each other. Therefore, ease of the releasing operation is achieved. When releasing the parking brake lever 28, the rubber member 96 on the lower surface of the handle upper arm portion 67 and the protruded portion 34A of the split clamp half 34 come into abutment with each other before the abutment between the stopper projection 72 of the handle rear arm portion 66 and the split clamp portion 36. Therefore, a flapping sound between the parking brake lever 28 and the holder body 33 is restrained, and the impact of the abutment between the stopper projection 72 and the holder body 33 (split clamp portion 36) is alleviated. When the stopper projection 72 and the split clamp portion 36 come into abutment with each other, there is a probability of generation of abrasion powder from the stopper projection 72 formed of resin and the split clamp portion 36 formed of aluminum. However, since the stopper projection 72 is formed at a position hardly visible from the appearance, such powder generation is inconspicuous.

FIG. 18(b) shows a state in which the parking brake lever 28 is rotated from the state shown in FIG. 18(a), and the flat portions at the distal ends of the second latchet teeth 71 are brought into abutment with the flat portions at the distal ends of the first latchet teeth 61 of the first latchet member 30. In this state, the flat portions at the distal ends of the second latchet teeth 71 presses against the flat portions of the distal ends at the first latchet teeth 61 of the first latchet member 30. Therefore, the rotation of the parking brake lever 28 is allowed and the flat portions at the distal ends of the second latchet teeth 71 are brought into a state of being slidable on the flat portions at the distal ends of the first latchet teeth 61 in association with the rotation of the parking brake lever 28.

As described above, in this embodiment, the parking brake lever 28 rotatably supported by the holder member 27 in the parking brake lever apparatus 15 includes the handle rear arm portion 66 provided adjacent to the left handle bar 20 rearward thereof in the unlocked position in which the parking brake caliper 14 is in the unlocked state, and the handle upper arm portion 67 provided adjacent to the left handle bar 20 upward thereof in the unlocked position in which the parking brake caliper 14 is in the unlocked state. The rotating shaft 44 of the parking brake lever 28 is provided in the handle rear arm portion 66 in substantially parallel to the direction of the axis of the left handle bar 20, so that the parking brake caliper 14 can be operated into the locked state by pulling the parking brake lever 28 upward.

Therefore, since the parking brake caliper 14 can be brought into the locked state by rotating the parking brake lever 28 upward, the desirable operability is ensured. Simultaneously, since the parking brake lever 28 is arranged so as to embrace the handle bar with the parking brake lever 28 in the unlocked position in which the parking brake caliper 14 is in the unlocked state, the compact arrangement of the parking brake lever apparatus 15 in the vehicle is also achieved. In addition, with the parking brake caliper 14 in the locked state, the parking brake lever 28 is positioned to project upward in comparison with the unlocked position in which the parking brake lever 28 is compactly arranged, whereby the locked state is made further recognizable.

Also, since the forward-inclined portion 91 which is inclined downward with respect to the upper end of the left handle bar 20 forward of the left handle bar 20 in the unlocked position is provided on the handle upper arm portion 67, ease of operation of the handle upper arm portion 67 is achieved by securing a certain length of the handle upper arm portion 67 of the parking brake lever 28. Also, since the parking brake lever 28 is provided so as to embrace the left handle bar 20 in the unlocked position, a further compact arrangement of the parking brake lever apparatus 15 in the vehicle is achieved.

The holder member 27 includes the holder body 33 and the split clamp half 34, which are two half members for split-clamping the left handle bar 20, and the handle upper arm portion 67 is formed to extend in the width direction so as to cover the split clamp portion of the holder member 27, more specifically, the split clamp portion 36 and the split clamp half 34 from above in the unlocked position. Therefore, the operability is enhanced by widening the width of the handle upper arm portion 67 of the parking brake lever 28 above the holder member 27, and the compact arrangement of both components in the width direction is achieved by arranging the parking brake lever 28 and the holder member 27 so as to overlap in the vertical direction. Furthermore, by covering the split clamp portion of the holder member 27 with the handle upper arm portion 67 of the parking brake lever 28, enhancement of the appearance and the sense of compactness of the parking brake lever apparatus 15 in the unlocked position is achieved.

In addition, the rubber member 96 which comes into abutment with the upper portion of the split clamp portion of the holder member 27, more specifically, with the protruded portion 34A of the split clamp half 34 in the unlocked position is provided on the lower surface of the handle upper arm portion 67. Therefore, the stopper of the parking brake lever 28 in the unlocked position is achieved by the abutment with the holder member 27 and, simultaneously, the parking brake lever 28 and the holder member 27 are protected by the intermediary of the rubber member 96.

In addition, the front extending portion 68 extending forward toward the left handle bar 20 is provided under the handle rear arm portion 66, and the rotating shaft 44 of the parking brake lever 28 is inserted through the front extending portion 68. Therefore, the rotating shaft 44 of the parking brake lever 28, which tends to be upsized, can be mounted unobtrusively owing to the position of the rotating shaft 44 of the parking brake lever 28 below the left handle bar 20. With the provision of the front extending portion 68, the rotating shaft 44 of the parking brake lever 28 is arranged in the front, which is the side of the left handle bar 20. Therefore, in a case where the left handle bar 20 indicated by a double-dashed chain line in FIG. 2 is steered to a fully steered position S, the interference between the fuel tank 8 and the holder member 27, which may occur when the front wheel steering device 6 is turned, is easily avoided.

Then, the indication switch 80 which enable or disable the showing of the indicator of the combination panel 26 which displays the locked state of the parking brake caliper 14 is arranged adjacent to the rotating shaft of the parking brake lever 28 in the holder member 27, the front extending arm portion 75 extending further to the front toward the left handle bar 20 is provided on the front extending portion 68 of the handle rear arm portion 66, the parking brake cable 16 is connected to the front extending arm portion 75, and a distal end of the front extending arm portion 75 is arranged so as to come into abutment against or move away from the indication switch 80 in association with the rotation of the parking brake lever 28. Therefore, turning on and off of the indication switch 80 is achieved by using the shape of the front extending arm portion 75 extending from the lower portion of the handle rear arm portion 66 for connecting the parking brake cable 16 as a cam, so that the indication switch 80 can be arranged as compact as possible.

The switch box 25 for operating the lighting systems of the vehicle is mounted on the left handle bar 20, and the parking brake lever apparatus 15 is arranged adjacent to the switch box 25. By arranging the parking brake lever apparatus 15 adjacent to the switch box 25, further enhancement of the sense of compactness of the parking brake lever apparatus 15 is achieved.

The parking brake lever 28 is configured by assembling the handle upper arm portion 67 rotatably on the top of the handle rear arm portion 66, and the handle upper arm portion 67 and the handle rear arm portion 66 are assembled via the spring 95 which is energized in the direction to pull up the parking brake lever 28. Therefore, even when an object or the operator's hand is placed on the handle upper arm portion 67 of the pulling-up type parking brake lever 28 from above by mistake, the handle upper arm portion 67 is rotated downward to elastically absorb the impact by the spring 95. Therefore, an exertion of a heavy load on the handle rear arm portion 66 is avoided.

Also, the handle rear arm portion 66 is provided with the spring seat 84 positioned at a certain distance from the handle upper arm portion 67 and extending along the handle upper arm portion 67, the handle upper arm portion 67 is provided with the spring accommodating annular depression 93 formed so as to face the spring seat 84 for accommodating the spring 95, the handle upper arm portion 67 and the handle rear arm portion 66 are configured to be rotatable by being connected with the connecting shaft 87, and the handle upper arm portion 67 is formed with the accommodating portion 89, which extends along the upper portion of the handle rear arm portion 66 and restricts the rotation of the handle upper arm portion 67 by coming into abutment with the upper portion, at a portion on the opposite side of the connecting shaft 87 from the spring 95. Therefore, the arrangement of the spring 95 so as to be hardly visible from the appearance is achieved in a simple and compact configuration.

Figure 19:
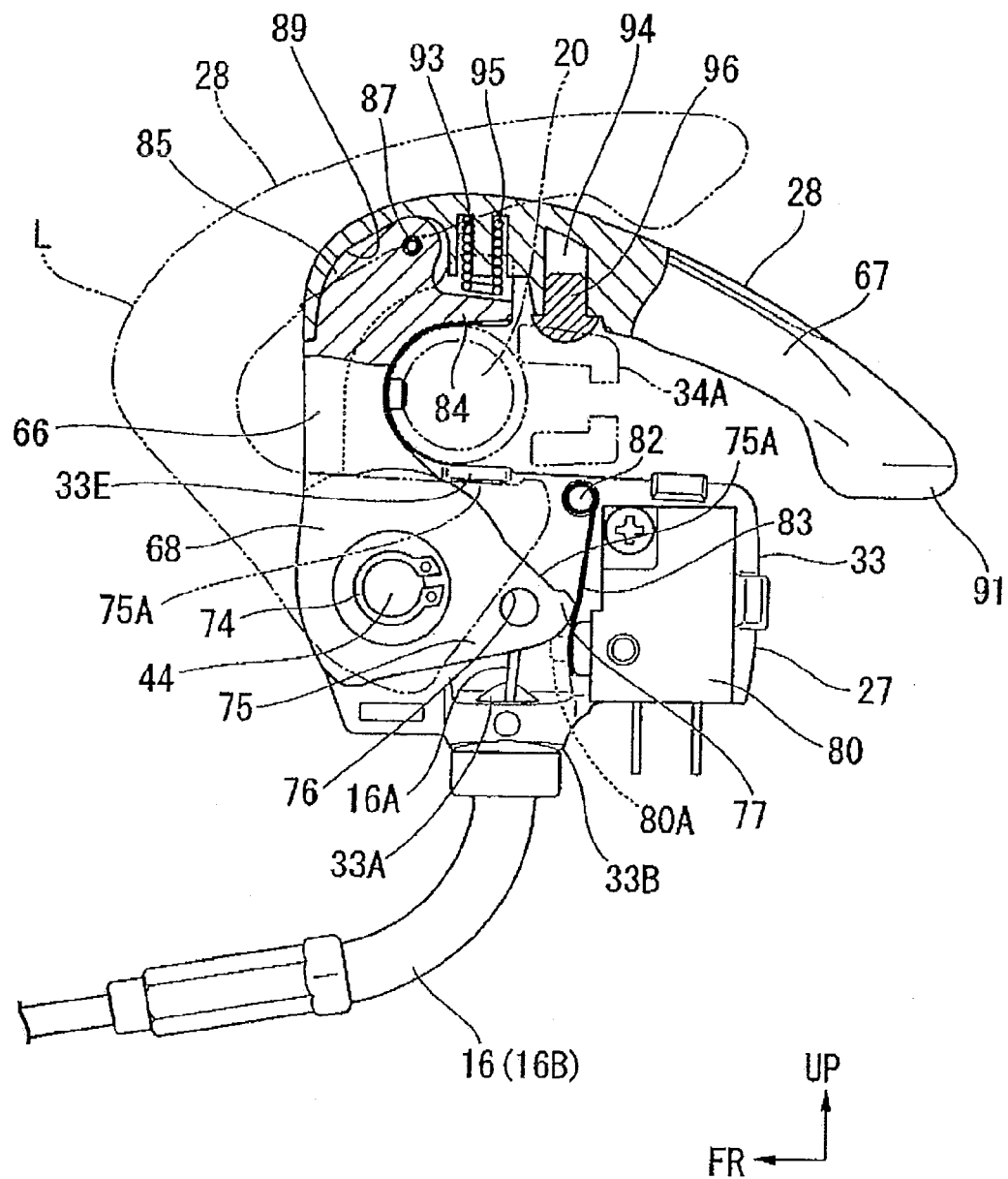
FIG. 19 is a drawing showing a modification of the present invention, and is a side view of the parking brake lever apparatus viewed from inside the vehicle body in the direction of axis of the handle bar.

In this embodiment, the handle rear arm portion 66 of the parking brake lever 28 is arranged adjacent to the left handle bar 20 rearward thereof. However, the parking brake lever 28 may be arranged adjacent to and in the front of the left handle bar 20 as shown in FIG. 19. In this case as well, the desirable operability is achieved, the compactness in the vehicle is achieved, and the ease of recognition of the locked state of the parking brake lever apparatus 15 is achieved. In this embodiment, the parking brake lever 28 and the second latchet member 31 are different members. However, the parking brake lever 28 and the second latchet member 31 may be integrally formed of aluminum alloy or the like. In this embodiment, the parking brake lever apparatus 15 is provided on the left handle bar 20 of the front wheel steering device 6 of so-called a separate type. However, the parking brake lever apparatus 15 according to the present invention may be desirably used also on a bar handle which extends integrally toward the left and right, and the parking brake apparatus may be provided at a center portion of such bar handle, that is, in the vicinity of the center portion in the vehicle width direction.

Figure 20:
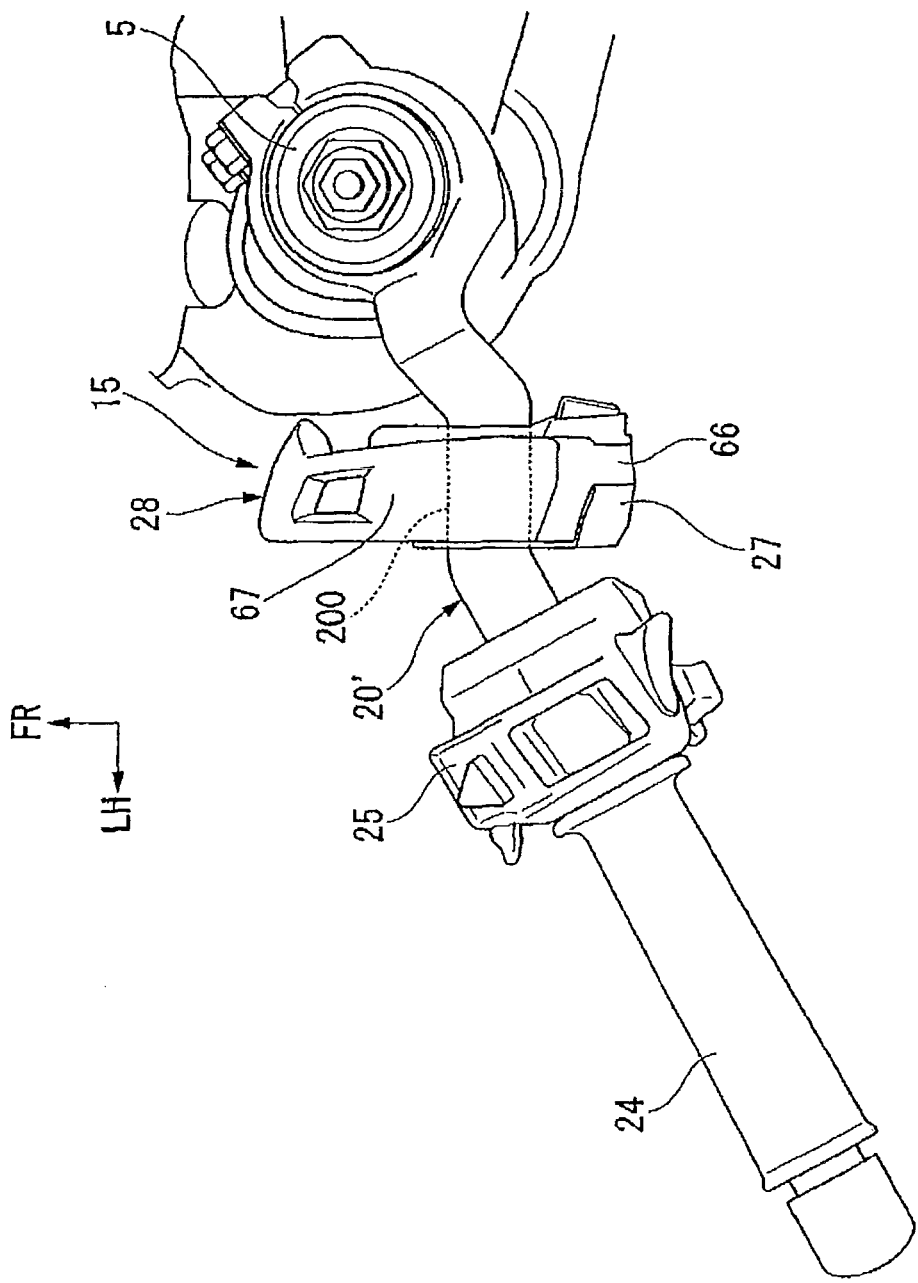
FIG. 20 is a drawing showing a modification of the present invention, and is an enlarged view of the handle bar having the parking brake lever apparatus mounted thereon.

In FIG. 20, a left handle bar 20' having a different shape from the left handle bar 20 is shown as a modification of the embodiment described above. In this example, the left handle bar 20' is formed with a parking brake lever mounting portion 200 which extends in parallel to the vehicle width direction when not being steered, and the parking brake lever apparatus 15 is mounted on the parking brake lever mounting portion 200. Then, the parking brake lever apparatus 15 is mounted in such a manner that the handle upper arm portion 67 of the parking brake lever 28 faces straight forward toward the front of the vehicle when the left handle bar 20' is not steered. Therefore, the handle upper arm portion 67 may be directed to extend along the fore-and-aft direction of the vehicle when operating the parking brake lever 28, so that further ease of operation is achieved.

In the embodiment described above, the example in which the present invention is applied to the parking brake lever has been described. However, the present invention is not limited thereto, and may be applied to various operating levers in the vehicle. As the various operating levers to which the present invention may be applied, a decompression lever, a chalk lever, or the like is conceivable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. An arrangement structure of a parking brake lever in a vehicle, the vehicle comprising:
    a handle bar configured to steer a front wheel of the vehicle;
    a braking device configured to bring a vehicle wheel into a locked state or an unlocked state;
    a cable connected at one end thereof to the braking device;

a pivotable parking brake lever having the other end of the cable connected thereto and being capable of operating the braking device into the locked state or the unlocked state; and a holder member fixed to the handle bar and supporting the parking brake lever while the parking brake lever is being pivoted, wherein:

the parking brake lever is a single member which includes a single handle vertical arm portion formed integrally with the parking brake lever, the handle vertical arm portion being provided adjacent to the handle bar either forward or rearward thereof in an unlocked position in which the braking device is in the unlocked state, and a handle upper arm portion provided adjacent to and above the handle bar in the unlocked position in which the braking device is in the unlocked state;

the arrangement structure further comprising:

a rotating shaft of the parking brake lever is provided on the handle vertical arm portion and has an axis that is substantially parallel to a direction of a longitudinal axis of the handle bar, and in order to place the braking device into the locked state, the parking brake lever is rotated around the rotating shaft in an upward and rearward direction, wherein the handle vertical arm portion is provided on an underside thereof with an extending portion extending either rearward or forward toward the handle bar, and the rotating shaft of the parking brake lever is provided on the extending portion, wherein the vehicle includes an indicator configured to display the locked state of the braking device, and an indication switch configured to enable or disable the showing of the indicator, and the indication switch is arranged on the holder member adjacent to the rotating shaft of the parking brake lever, said handle vertical arm portion being provided on the extending portion thereof with an extending arm portion extending from the rotating shaft of the parking brake lever further rearward or forward toward the handle bar, and the other end of the cable being connected to the extending arm portion and a distal end of the extending arm portion is arranged so as to come into abutment with or move away from the indication switch in association with the rotation of the parking brake lever.

2. The arrangement structure of the parking brake lever according to claim 1, wherein the handle upper arm portion includes a suspending portion suspending downward with respect to an upper end of the handle bar either forward or rearward of the handle bar in the unlocked position.

3. The arrangement structure of the parking brake lever according to claim 1, wherein the holder member includes two half members configured to split-clamp the handle bar, and wherein the handle upper arm portion is a single handle upper arm portion formed to extend in a width direction, and in an unlocked position, the single handle upper arm portion covers from above a split clamp joint where the two half members are clamped together.

4. The arrangement structure of the parking brake lever according to claim 3, wherein the single handle upper arm portion is provided with an elastic member on a lower surface thereof so as to come into abutment with an upper portion of the split clamp joint of the holder member in the unlocked position.

5. The arrangement structure of the parking brake lever according to claim 1, wherein the handle bar includes a switch box mounted thereon for operating lighting systems of the vehicle, and the parking brake lever is arranged adjacent to the switch box.

6. The arrangement structure of the parking brake lever according to claim 1, wherein the parking brake lever is configured by rotatably assembling the handle upper arm portion to the upper portion of the handle vertical arm portion, and the handle upper arm portion and the handle vertical arm portion are assembled via an energizing spring member energized in a direction to pull up the parking brake lever.

7. The arrangement structure of the parking brake lever according to claim 6, wherein the handle vertical arm portion is provided with an energizing spring member seat positioned at a certain distance from the handle upper arm portion and extending along the handle upper arm portion, the handle upper arm portion is provided with an energizing spring member accommodating depression formed so as to face the energizing spring member seat for accommodating the energizing spring member, the handle upper arm portion and the handle vertical arm portion are rotatable by being connected with each other with a pin member, and the handle upper arm portion is provided with a stopper portion on the opposite side of the pin member from the energizing spring member so as to extend along an upper portion of the handle vertical arm portion for restricting the rotation of the handle upper arm portion by coming into abutment with the upper portion.

8. The arrangement structure of the parking brake lever according to claim 1, wherein the parking brake lever is pivotally supported so that the handle upper arm portion extends over the handle bar and forward toward a front of the vehicle in a direction that is substantially perpendicular to the longitudinal axis of the handle bar.

9. An arrangement structure of a pivotable operating lever in a vehicle, the vehicle comprising:

a handle bar for steering a front wheel of the vehicle;

a movable component taking different positions depending on whether the movable component is in an operating state or a non-operating state;

a cable connected at one end thereof to the movable component;

a pivotable operating lever having the other end of the cable connected thereto and being capable of operating the movable component into the operating state or the non-operating state; and a holder member fixed to the handle bar and pivotally supporting the operating lever while the pivotable operating lever is being pivoted, wherein:

the pivotable operating lever is a single member which includes a handle vertical arm portion formed integrally with the pivotable operating lever, the handle vertical arm portion being provided adjacent to the handle bar either forward or rearward thereof in a non-operating position in which the movable component is in the non-operating state, and a handle upper arm portion provided adjacent to and above the handle bar upward thereof in the non-operating position in which the movable component is in the non-operating state, and the arrangement structure further comprising:

a rotating shaft of the pivotable operating lever is provided on the handle vertical arm portion and has an axis that is substantially parallel to the direction of the axis of the handle bar, and in order to place the movable component into the operating state, the pivotable operating lever is rotated around the rotating shaft in an upward and rearward direction, wherein the pivotable operating lever is configured by rotatably assembling the handle upper arm portion to the upper portion of the handle vertical arm portion, and the handle upper arm portion and the handle vertical arm portion are assembled via an energizing spring member energized in a direction to pull up the pivotable operating lever, wherein the handle vertical arm portion is provided with an energizing spring member seat positioned at a certain distance from the handle upper arm portion and extending along the handle upper arm portion, the handle upper arm portion is provided with an energizing spring member accommodating depression formed so as to face the energizing spring member seat for accommodating the energizing spring member, the handle upper arm portion and the handle vertical arm portion are rotatable by being connected with each other with a pin member, and the handle upper arm portion is provided with a stopper portion on the opposite side of the pin member from the energizing spring member so as to extend along an upper portion of the handle vertical arm portion for restricting the rotation of the handle upper arm portion by coming into abutment with the upper portion.

10. The arrangement structure of the pivotable operating lever according to claim 9, wherein the handle vertical arm portion is provided on an underside thereof with an extending portion extending either rearward or forward toward the handle bar, and the rotating shaft of the pivotable operating lever is provided on the extending portion.

11. The arrangement structure of the pivotable operating lever according to claim 10, wherein the vehicle includes an indicator configured to display the locked state of the braking device, and an indication switch configured to enable or disable the showing of the indicator, and the indication switch is arranged on the holder member adjacent to the rotating shaft of the pivotable operating lever, said handle vertical arm portion being provided on the extending portion thereof with an extending arm portion extending from the rotating shaft of the pivotable operating lever further rearward or forward toward the handle bar, and said other end of the cable being connected to the extending arm portion and a distal end of the extending arm portion is arranged so as to come into abutment with or move away from the indication switch in association with the rotation of the pivotable operating lever.

12. An arrangement structure of a pivotable operating lever having substantially an L-shape when viewed in a direction of an axis of a handle bar, the pivotable operating lever including:

a grip portion and a single pivotably supported portion formed together as a single member, the grip portion provided on one arm portion of the pivotable operating lever; and the arrangement structure comprising:

a holder member fixed to the handle bar and pivotally supporting the pivotable operating lever while the pivotable operating lever is being pivoted, the single pivotably supported portion pivotally supported by the handle bar so as to be rotatable at a distal end of an arm portion on an opposite end of the operating lever;

wherein the handle bar is arranged between the grip portion and the pivotally supported portion, and the grip portion and the single pivotably supported portion of the pivotable operating lever are rotatable in a plane which is substantially perpendicular to a longitudinal axis of the handle bar, and when the pivotable operating lever is in an unlocked state, the grip portion is positioned adjacent to and above the handle bar, wherein the pivotable operating lever is configured by rotatably assembling the grip portion to the upper portion of the single pivotably supported portion, and the grip portion and the single pivotably supported portion are assembled via an energizing spring member energized in a direction to pull up the pivotable operating lever.

wherein the single pivotably supported portion is provided with an energizing spring member seat positioned at a certain distance from the grip portion and extending along the grip portion, the grip portion is provided with an energizing spring member accommodating depression formed so as to face the energizing spring member seat for accommodating the energizing spring member, the grip portion and the single pivotably supported portion are rotatable by being connected with each other with a pin member, and the grip portion is provided with a stopper portion on the opposite side of the pin member from the energizing spring member so as to extend along an upper portion of the single pivotably supported portion for restricting the rotation of the grip portion by coming into abutment with the upper portion.

13. The arrangement structure of the pivotable operating lever according to claim 12, wherein the single pivotably supported portion is provided on an underside thereof with an extending portion extending either rearward or forward toward the handle bar, and the rotating shaft of the pivotable operating lever is provided on the extending portion.

14. The arrangement structure of the pivotable operating lever according to claim 13, wherein the vehicle includes an indicator configured to display the locked state of the braking device, and an indication switch configured to enable or disable the showing of the indicator, and the indication switch is arranged on the holder member adjacent to the rotating shaft of the pivotable operating lever, said single pivotably supported portion being provided on the extending portion thereof with an extending arm portion extending from the rotating shaft of the pivotable operating lever further rearward or forward toward the handle bar, and said other end of the cable being connected to the extending arm portion and a distal end of the extending arm portion is arranged so as to come into abutment with or move away from the indication switch in association with the rotation of the pivotable operating lever.

15. The arrangement structure of the operating lever according to claim 12, wherein the substantially L-shaped pivotable operating lever is pivotally supported so that the one arm portion is arranged above the handle bar and extends in a direction which is substantially perpendicular to the axis of the handle bar.

16. An arrangement structure of a parking brake lever for use with a vehicle comprising:
- a handle bar adapted to steer a front wheel of the vehicle;
- a braking device configured to bring a vehicle wheel into a locked state or an unlocked state;
- a cable connected at one end thereof to the braking device;
- a pivotable parking brake lever having an opposite end of the cable connected thereto and being capable of operating the braking device into the locked state or the unlocked state; and
- a holder member fixed to the handle bar and supporting the parking brake lever while the parking brake lever is being pivoted;
- wherein said parking brake lever is a single member which includes:
- a single handle vertical arm portion formed integrally with the parking brake lever, the handle vertical arm portion being operatively positioned adjacent to the handle bar either forward or rearward thereof in an unlocked position in which the braking device is in the unlocked state, and a handle upper arm portion provided adjacent to and above the handle bar upward thereof in the unlocked position in which the braking device is in the unlocked state; the arrangement structure further comprising:
- a rotating shaft of the parking brake lever is operatively positioned on the handle vertical arm portion and has an axis that is substantially parallel to a direction of a longitudinal axis of the handle bar, and
- in order to place the braking device into the locked state, the parking brake lever is rotated in an upward and rearward direction,
- wherein the handle vertical arm portion is provided on an underside thereof with an extending portion extending either rearward or forward toward the handle bar, and
- the rotating shaft of the parking brake lever is provided on the extending portion,
- wherein the vehicle includes an indicator configured to display the locked state of the braking device, and an indication switch configured to enable or disable the showing of the indicator, and the indication switch is arranged on the holder member adjacent to the rotating shaft of the parking brake lever,
- said handle vertical arm portion being provided on the extending portion thereof with an extending arm portion extending from the rotating shaft of the parking brake lever further rearward or forward toward the handle bar, and
- the other end of the cable being connected to the extending arm portion and a distal end of the extending arm portion is arranged so as to come into abutment with or move away from the indication switch in association with the rotation of the parking brake lever.

17. The arrangement structure of the parking brake lever according to claim 16, wherein the handle upper arm portion includes a suspending portion suspending downward with respect to an upper end of the handle bar either forward or rearward of the handle bar in the unlocked position.

18. The arrangement structure of the parking brake lever according to claim 16, wherein the holder member includes two half members configured to split-clamp the handle bar, and
- wherein the handle upper arm portion is a single handle upper arm portion formed to extend in a width direction, and in an unlocked position, the single handle upper arm portion from above a split clamp joint where the two half members are clamped together.

19. The arrangement structure of the parking brake lever according to claim 18, wherein the single handle upper arm portion is provided with an elastic member on a lower surface thereof so as to come into abutment with an upper portion of the split clamp joint of the holder member in the unlocked position.

20. The arrangement structure of the parking brake lever according to claim 16, wherein the parking brake lever is configured by rotatably assembling the handle upper arm portion to an upper portion of the handle vertical arm portion, and
- the handle upper arm portion and the handle vertical arm portion are assembled via an energizing spring member energized in a direction to pull up the parking brake lever.

* * * * *